United States Patent [19]

Baldwin et al.

[11] Patent Number: 4,590,559
[45] Date of Patent: May 20, 1986

[54] DATA DISC SYSTEM FOR A COMPUTED TOMOGRAPHY X-RAY SCANNER

[75] Inventors: David R. Baldwin, Staines; Douglas H. Hodgkiss, Hayes, both of England

[73] Assignee: Tokyo Shibaura Denki Kabushiki Kaisha, Kawasaki, Japan

[21] Appl. No.: 554,727

[22] Filed: Nov. 23, 1983

[51] Int. Cl.$^4$ .................. G06F 15/42; G01T 1/29
[52] U.S. Cl. .................. 364/414; 378/14; 378/901
[58] Field of Search .......... 364/413, 414, 417; 378/4, 14, 21–22, 99–100, 901; 358/111; 360/97–98, 135

[56] References Cited

U.S. PATENT DOCUMENTS

| 3,582,651 | 6/1971 | Siedband | 358/111 X |
| 3,673,317 | 6/1972 | Newell et al. | 358/111 X |
| 4,123,786 | 10/1978 | Cramer | 358/111 X |
| 4,167,039 | 9/1979 | Kowalsi | 364/414 X |
| 4,182,311 | 1/1980 | Seppi et al. | 364/414 X |
| 4,197,583 | 4/1980 | Westell et al. | 364/414 |
| 4,458,267 | 7/1984 | Dolazza | 358/111 |
| 4,482,958 | 11/1984 | Nakayama et al. | 364/414 |
| 4,494,141 | 1/1985 | Altekruse | 358/111 |
| 4,504,909 | 3/1985 | Acharya et al. | 364/414 |

Primary Examiner—Gary V. Harkcom
Attorney, Agent, or Firm—Finnegan, Henderson, Farabow, Garrett & Dunner

[57] ABSTRACT

A data disc system for a computed tomography X-ray scanner employing a plurality of disc drives for writing data into and reading data from corresponding discs. The disc drives are asynchronously operated in conjunction with a processor which writes data in parallel into the same cylinder of different ones to the discs and subsequently reads data in parallel from different cylinders of different ones of the discs to convert data from source fan format into detector fan format. In the alternative, the processor writes data in parallel to different cylinders of different ones of the discs and reads data in parallel from the same cylinder of different ones of the discs to convert data from source fan format into detector fan format.

14 Claims, 14 Drawing Figures

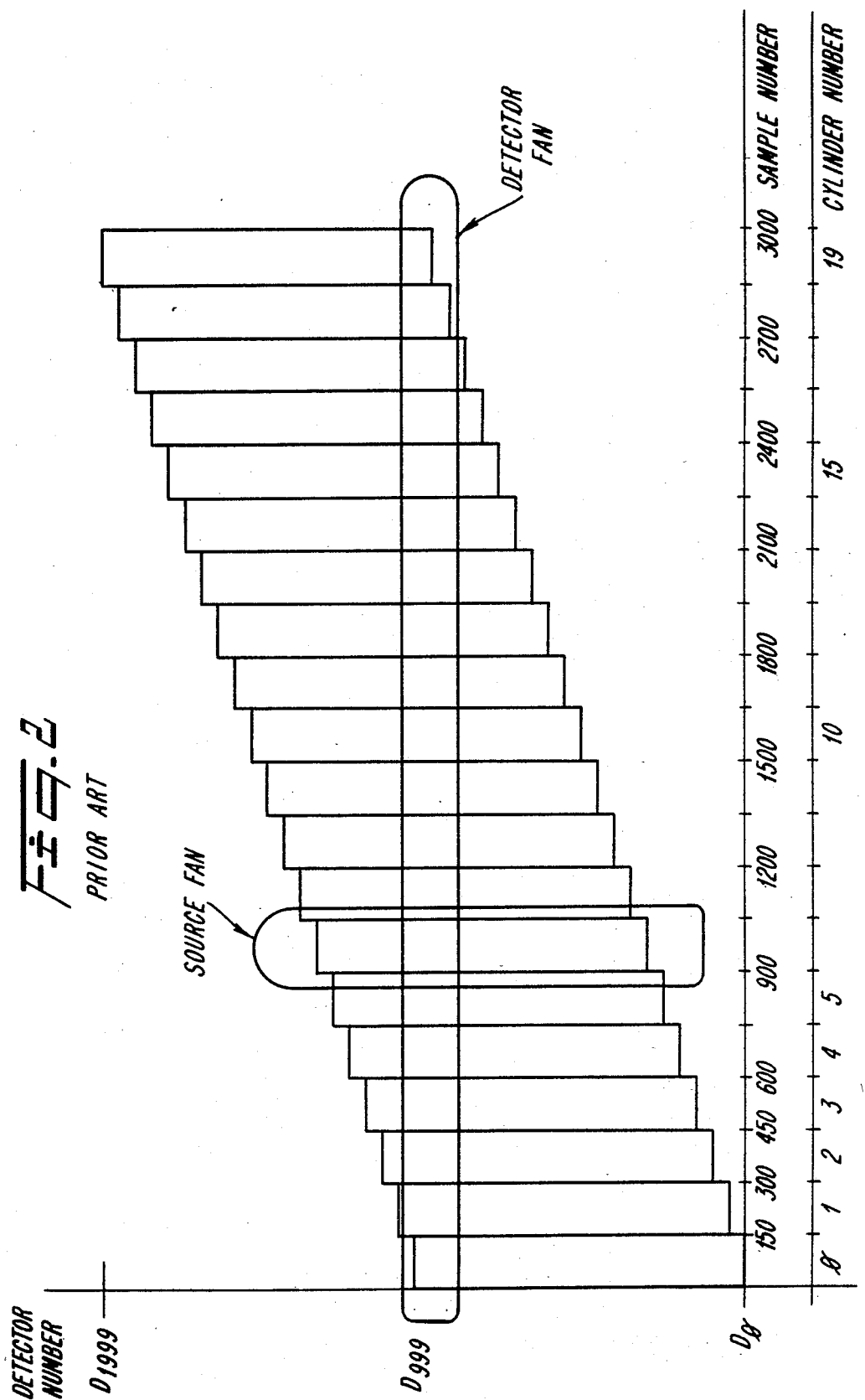

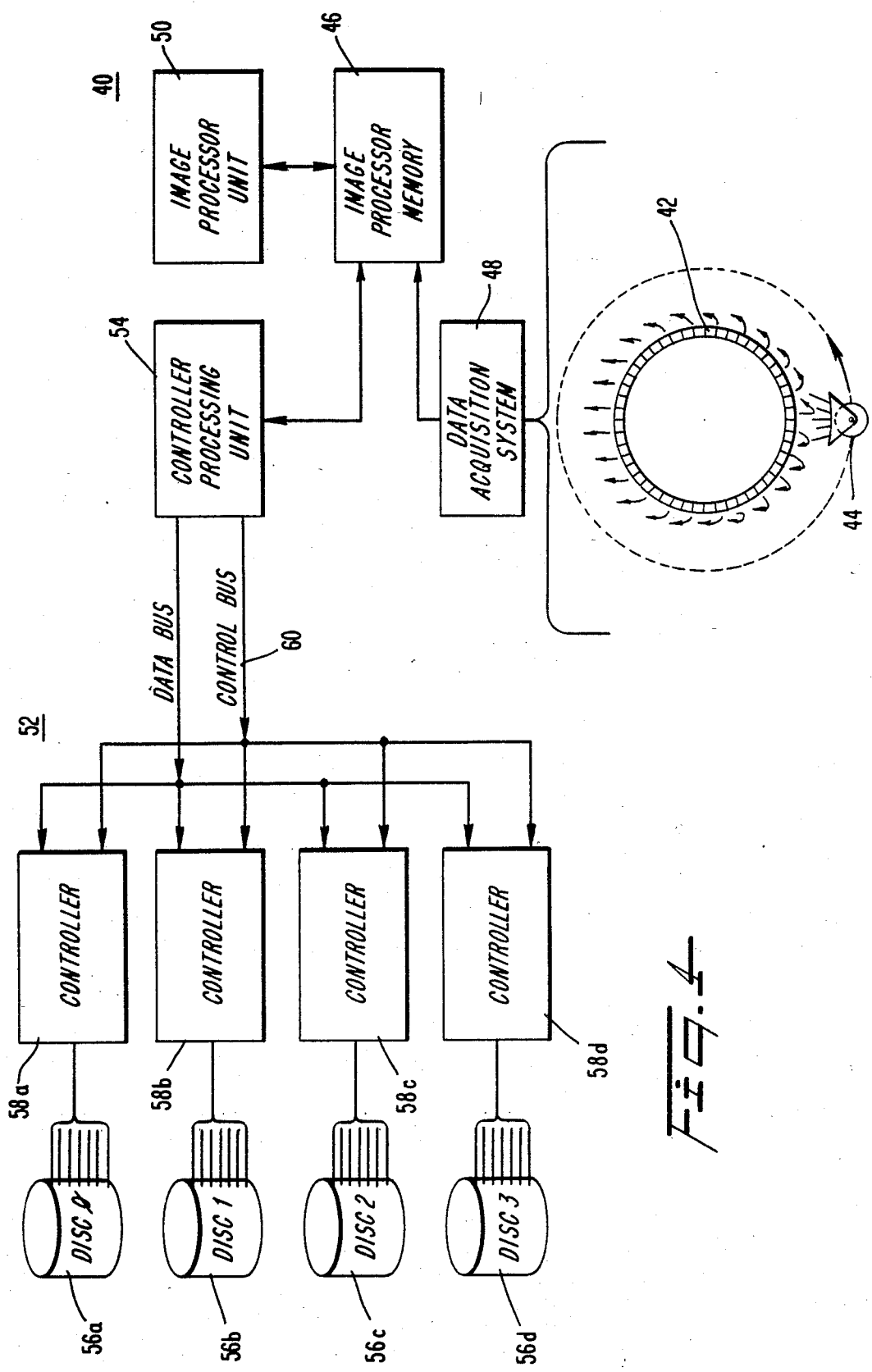

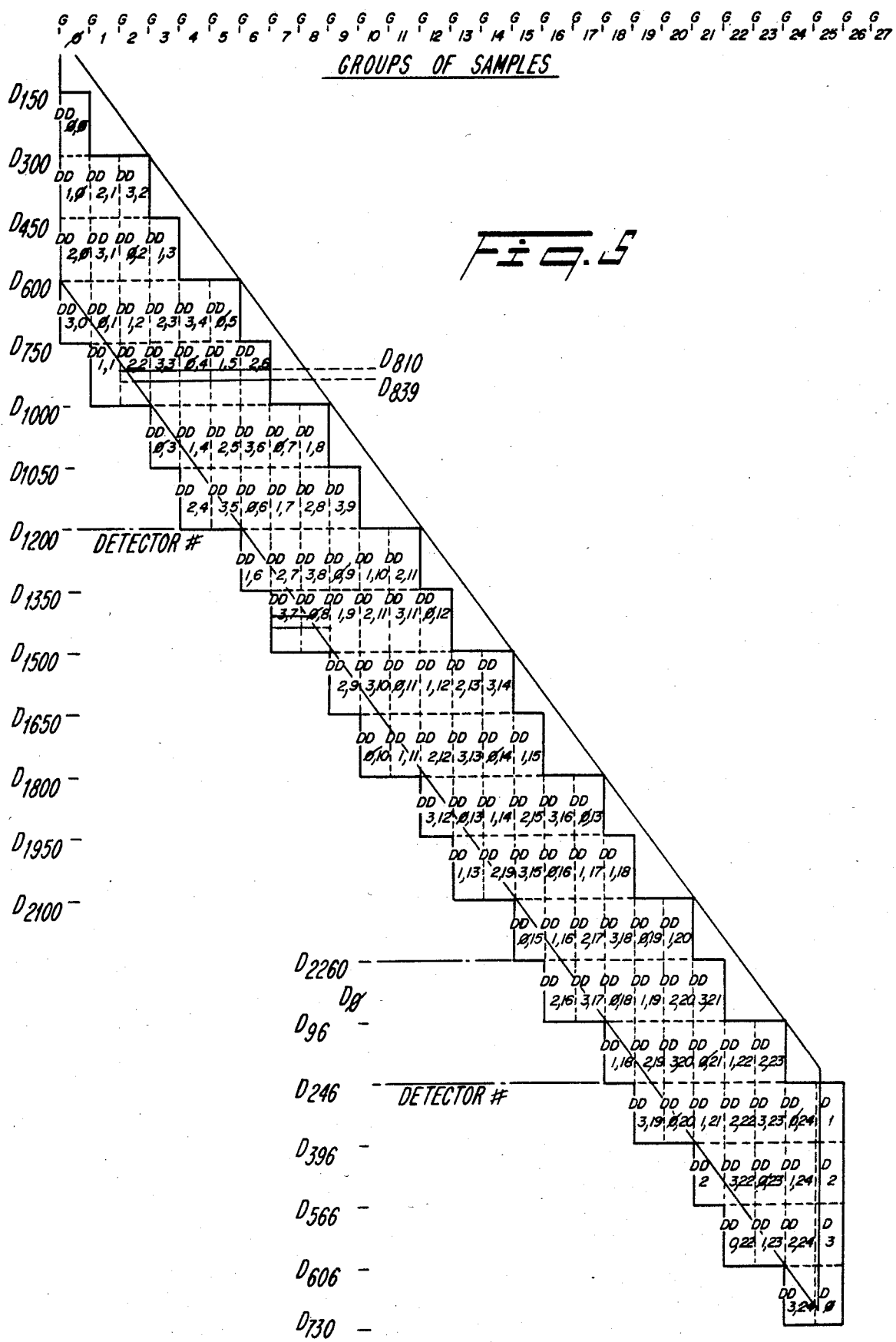

Fig. 6

| BUFFER ADDRESS | | | | | | | | | | | SECTOR |
|---|---|---|---|---|---|---|---|---|---|---|---|
| 0 | $D_{N, 0-63}$ | $D_{N, 64-127}$ | $D_{N+1, 0-63}$ | $D_{N+1, 64-127}$ | | | | | | | 0 |
| 1024 | $D_{N+8, 0-63}$ | $D_{N+8, 64-127}$ | $D_{N+9, 0-63}$ | $D_{N+9, 64-127}$ | | | | | | | 4 |
| 1280 | $D_{N}$ 128–152 | $D_{N+1}$ — | $D_{N+2}$ — | $D_{N+3}$ — | $D_{N+4}$ — | $D_{N+5}$ — | $D_{N+6}$ — | $D_{N+7}$ — | $D_{N+8}$ — | $D_{N+9}$ — | 5 |
| 7680 | $D_{N+50, 0-63}$ | $D_{N+50, 64-127}$ | $D_{N+51, 0-63}$ | $D_{N+51, 64-127}$ | | | | | | | 30 |
| 8448 | $D_{N+56, 0-63}$ | $D_{N+56, 64-127}$ | $D_{N+57, 0-63}$ | $D_{N+57, 64-127}$ | | | | | | | 33 |
| 8704 | $D_{N+50}$ 128–152 | $D_{N+51}$ — | $D_{N+52}$ — | $D_{N+53}$ — | $D_{N+54}$ — | $D_{N+55}$ — | $D_{N+56}$ — | $D_{N+57}$ — | ///// | ///// | 34 |

DATA DISC SYSTEM FOR A COMPUTED TOMOGRAPHY X-RAY SCANNER

BACKGROUND OF THE INVENTION

I. Field of the Invention

The present invention relates to a multiple spindle data disc system which is used in connection with a computed tomography X-ray scanner having a plurality of detectors, a source of X-rays movable relative to the detectors, and a memory unit which receives data from the detectors in source fan format.

II. Description of the Prior Art

Fourth generation computed tomography (CT) X-ray scanners produce data organized in source fans which must be reorganized into detector fans before this data can be used effectively in an image processing reconstruction algorithm. More specifically, in FIG. 1 there is illustrated a source of X-rays 10 and a ring 12 of detectors $D_0$ through D1999. Source 10 is movable with respect to detectors $D_0$ through D1999. In any given position, source 10 generates a fan of X-rays 14 which strike a limited number of detectors, for example detectors $D_0$ through D999. Fan of X-rays 14 in the course of reaching detectors $D_0$ through D999 also passes at least in part through a target 16. Thus, the output of detectors $D_0$ through D999, with source 10 in the illustrated position of FIG. 1, provides a first "source fan format" of data representing the content of target 16.

As mentioned above, source 10 is movable with respect to detectors $D_0$ through D1999. For example, source 10 may revolve in a clockwise direction with detectors $D_0$ through $D_{1999}$ being stationary. When source 10 reaches a new position, the output of the detectors in ring 12 is observed as providing a new set of data in source fan format. More specifically, as illustrated in FIG. 1, a second fan of X-rays 18 may be generated when source 10 assumes a subsequent location 20. In subsequent location 20, fan 18 strikes detectors $D_N$ through $D_{999+N}$.

Of course, source 10 may revolve in an orbit which is the same diameter, larger than, or smaller than the diameter of ring 12. Moreover, source 10 may be stationary and ring 12 rotate. Still further, source 10 might take the form of a stationary ring, and the position at which X-rays are emitted rotate about that ring. All that is required is relative motion between the source of X-rays and a plurality of detectors.

As source 10 completes a full revolution, a plurality of samples are generated in detectors $D_0$ through $D_{1999}$, one sample for each position of source 10.

The output of detectors $D_0$ through $D_{1999}$ may be stored in a standard disc drive. A standard disc drive, for example, may comprise a package of ten memory storage discs stacked one above the other, thereby providing twenty disc surfaces for storage of data. With one surface dedicated to location control, nineteen disc surfaces are available for memory storage. Each surface may, for example, be divided into 800 tracks with each track divided into 32 sectors. A cylinder is typically defined as including one track from each of the 19 surfaces, each located above or below another so that each such conventional disc drive has 800 cylinders with 19 tracks per cylinder.

If each sector has 512 bytes of 8 bits each, and data words are generated from each detector $D_0$ through $D_{1999}$ of 16 bits in length, each sector has the capacity of storing 256 such data words.

Accordingly, the data from detectors $D_0$ through $D_{1999}$ illustrated in FIG. 1 as source 10 is moved one complete revolution may be stored on such a prior art disc drive in the manner illustrated in FIG. 2. More specifically, if each cylinder has 19 usable tracks (surfaces) and each track has 32 sections, and each section is capable of storing 256 16 bit detector data words, then each cylinder is capable of storing approximately 150,000 detector data words. If approximately 1000 detectors are involved in each sample, then approximately 150 samples of 1000 detectors each can be stored in each cylinder. Accordingly, as shown in FIG. 2, cylinder number 0 may be used to store data for detectors $D_0$ through the highest number detector employed in sample 150, and subsequent cylinders 1, 2, 3, . . . 20 are used to store data from detectors involved in subsequent sample numbers 151–300, 301–450, 451–600, and so on. In this manner, data from on the order of 3000 source fans may be effectively stored in a prior art disc drive.

However, as before mentioned, it is necessary that data organized in source fan format be reorganized into detector fan format before such data can be effectively used in an image processing reconstruction algorithm. The term "detector fan" format may be explained with regard to FIG. 3, in which source 10 is shown illustratively located in a plurality of source positions $S_1$ through $S_8$ and detectors $D_N$ and $D_{N+1}$ are illustrated along detector ring 12. Also shown is target 16. For purposes of explanation (but not limitation), source 10 is assumed to begin in a position $S_1$ and revolve in a clockwise direction through position $S_8$. In positions $S_1$ through $S_7$, source 10 provides information for detector $D_N$. In positions $S_2$ through $S_8$, source 10 provides information for detector $D_{N+1}$. The collection of data from detector $D_N$ with source 10 in positions $S_1$ through $S_7$ is data organized in a "detector fan" format. Likewise, data from detector $D_{N+1}$ with source 10 in positions $S_2$ through $S_8$ is data organized in a "detector fan" format for detector $D_{N+1}$.

With regard to FIG. 2, accordingly, detector fan format data is illustrated as a horizontal sampling of data for any particular group of detectors for each of cylinders 0–19. Accordingly, to obtain a detector fan format of data from a disc drive having data stored as illustrated in FIG. 2, each of cylinders 0–19 must be interrogated. However, to move from one cylinder to another on a disc drive requires physical movement of the disc drive head and, therefore, requires a substantial amount of time. In addition, the process of selecting particular data from each cylinder required to accumulate a detector fan format of data for a particular group of detectors requires substantial memory and data processing capability.

SUMMARY OF THE INVENTION

It is, accordingly, a primary object of the present invention to provide a data disc system in which data may be quickly, efficiently and economically converted from source fan format to detector fan format.

Additional objects and advantages of the invention will be set forth, in part, in the description which follows and, in part, will be obvious from the description or may be learned by practice of the invention.

To achieve the foregoing objects, and in accordance with the purposes of the invention as embodied and broadly described herein, a data disc system is provided for a computed tomography X-ray scanner having a plurality of detectors, a source of X-rays movable relative to said detectors, and a memory unit which receives data from the detectors in source fan format, with the data disc system of the subject invention comprising: (a) a plurality of disc drives; and (b) processor means for writing the data from the memory unit into the disc drives and for reading that data from the disc drives back into the memory unit, the processor means ordering the storage locations of the data in the disc drives upon writing the data into the disc drives and ordering the storage locations of the data in the disc drives from which the data is read to convert the data from source fan format to detector fan format upon the reading of the data from the disc drives into the memory unit. Preferably, the processor means includes means for asynchronously operating the disc drives. It is still further preferable that the processor means writes data in parallel into the same cylinder of the disc drives from the memory unit and then reads data in parallel from different cylinders of the disc drives into the memory unit for detector fan format image processing. In the alternative, the processor means writes data from the memory in parallel to different cylinders of the disc drives and reads data in parallel from the same cylinder of different ones of the disc drives back into the memory unit for detector fan format image processing.

In different words, the data disc system of the subject invention may be described as comprising (a) a plurality of disc drives each having a plurality of cylinders; (b) a memory unit, and (c) processor means for: (i) writing data in parallel from a limited number of detectors for a group of sequentially generated samples stored in the memory unit into the same cylinder of each of the disc drives in an order which locates the data for select sets of the detectors for a plurality of the groups of the samples in different cylinders of the disc drives for each group; and (ii) reading data from the select sets of the detectors in parallel from different cylinders of the disc drives back into the memory unit for detector fan format image processing.

In the alternative, there is provided microprocessor means for (i) writing data in parallel from a limited number of detectors of a group of sequentially obtained samples stored in the memory unit into different cylinders of each of the disc drives in an order which locates the data for select sets of the detectors for a plurality of the groups of the samples in the same cylinder of the disc drives for each group; and (ii) reading data for the select sets of detectors in parallel from the same cylinder of the disc drives back into the memory unit for detector fan format imaging processing.

Preferably, the processor means of the subject invention includes a plurality of disc interface processors with each disc interface processor associated with at least one of the disc drives. Moreover, it is preferable that the system includes an image processor for constructing output signals which represent an image of a target being scanned by the system, the image processor constructing an output signal from the data signals organized in detector fan format. The processor means of the subject invention preferably further includes a data channel processor and disc system coordinator coupled between the image processor and the interface processors, the data channel processor and disc system coordinator controlling operation of the disc interface processor independent of the image processor.

In any event, it is further preferable that each disc interface processor include means for operating the disc drives associated with that disc interface processor asynchronously from disc drives associated with the other disc interface processors.

BRIEF DESCRIPTION OF THE DRAWINGS

FIG. 2. is an illustration of the manner in which data may be stored in a prior art single spindle disc system for a CT scanner;

FIG. 4 is a block diagram of a data disc system incorporating the teachings of the present invention;

FIG. 5 illustrates data organization in a processor in accordance with one embodiment of the present invention;

FIG. 6 illustrates the manner in which data may be organized in each cylinder of a disc drive in accordance with the teachings of the present invention;

DESCRIPTION OF THE PREFERRED EMBODIMENTS

Figure 1:
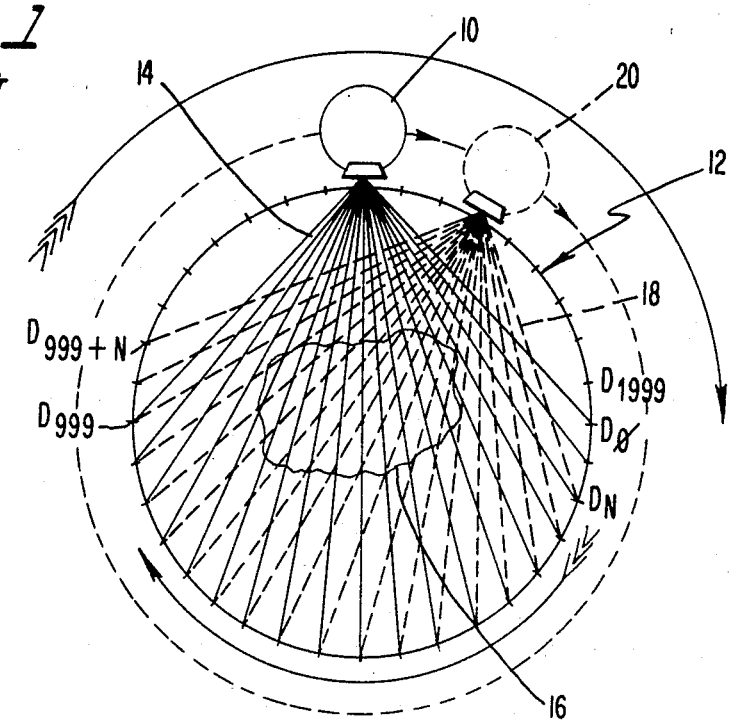
Fig. 1 is a schematic drawing of a prior art CT scanner to describe data organized in source fan format.
Figure 3:
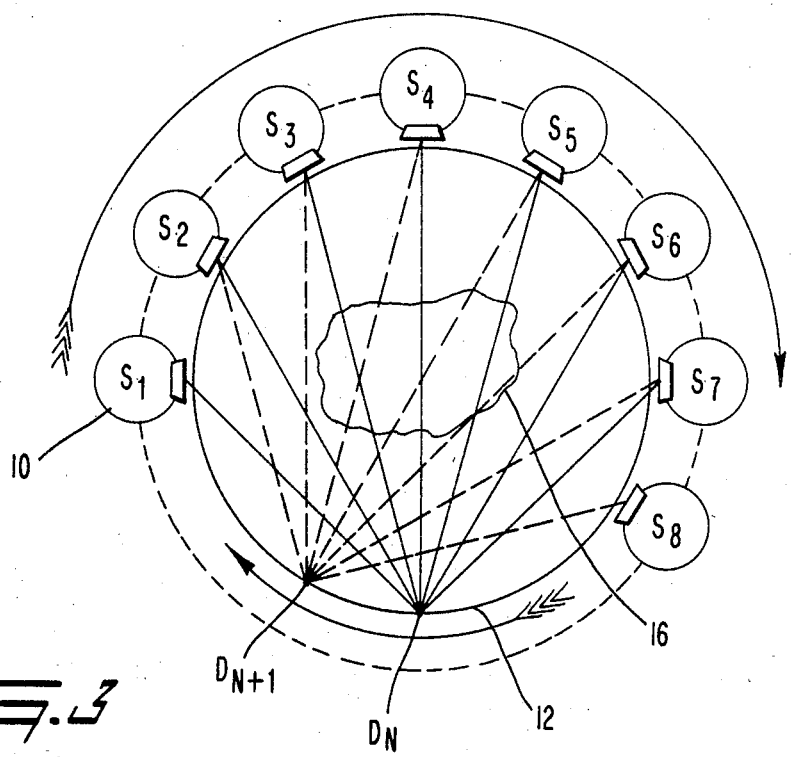
FIG. 3 is a schematic diagram of a prior art CT scanner to describe data organized in source fan format.

Reference will now be made in detail to the present preferred embodiment of the subject invention as illustrated in the accompanying drawings.

The data disc system of the subject invention is intended for use in connection with a computer tomography X-ray scanner, which scanner has a plurality of detectors, a source of X-rays movable relative to the detectors, and a memory unit which receives data from those detectors in source fan format. For example, in FIG. 4 there is illustrated a data disc system 40 for a computed tomography X-ray scanner. System 40 is illustrated in FIG. 4 as including a plurality of detectors 42 and a source of X-rays 44 which is movable relative to X-ray detectors 42. In addition, data disc system 40 includes an image processor memory unit 46 which receives data from detectors 42 through the operation of a data acquisition system 48. Data is received from detectors 42 by memory 46 in source fan format as is well-known to those skilled in the art.

System 40 includes an image processor unit 50 which operates upon data stored in memory 46 by any detector fan reconstruction algorithm. Accordingly, it is preferable that image processor unit 50 have data available from memory 46 in detector fan format not source format.

The term "memory 46," and the use of the term "memory unit" herein, are intended to be broadly construed as any mechanism which can store data. Accordingly, "memory 46" and the "memory unit" of the subject invention may actually comprise multiple RAMs or the like which are physically located in different units. Moreover, one RAM might be used to store input data from the detectors and a second RAM used to store returned detector fan format data from the disc drives of the present invention. The collection of all memory devices used to store inputted detector information and data to be processed into images are commonly represented by memory 46 and the "memory unit" of the subject invention.

Image processor memory 46 typically is not capable of storing the excessive amount of data generated by detectors 42 for each sample position of X-ray source 44. Accordingly, external disc system 52 is provided for the storage of data generated by detectors 42. Data from detectors 42 is, accordingly, first stored in memory 46 and then subsequently moved from memory 46 to disc system 52 under the operation of control processing unit 54. Processing unit 54 may be considered, thereafter, as part of disc system 52.

In accordance with the present invention, a disc system is provided which includes a plurality of disc drives. As illustratively shown in FIG. 4, for example, there are provided disc drives 56A, B, C, and D. Each of disc drives 56A-D are preferably of the standard "Winchester" disc drive variety. Each of discs 56A-D is illustrated in FIG. 4 as being coupled to an individual controller 58A-D, respectively. As will be described in more detail below, each of controllers 58A-D individually controls the operation of respective disc 56A-D in response to control signals sent over bus 60 by controller processing unit 54.

In accordance with the present invention, a data disc system is further provided with processor means for writing data from a memory unit into a plurality of disc drives and reading that data from the disc drives back into the memory unit, the processor means ordering the storage location of the data in the disc drives upon writing the data into the disc drives and ordering the storage locations of the data in the disc drives from which the data is read to convert the data from source fan format to detector fan format upon reading of the data from the disc drives back into the memory unit. With regard to the illustrative example of a data disc system illustrated in FIG. 4, controller processing unit 54, in combination with individual controllers 58A-D operates as will be described in more detail below to write data from image processor memory 46, which had been entered into image processor memory 46 in source fan format, from memory 46 into disc drives 56A-D. In addition, controller processing unit 54 in combination with controllers 58A-D operates to read data from disc drives 56A-D back to image processor memory 46 as will be further described below. Processing unit 54, as is described below, orders the storage locations of this data in disc drives 56A-D upon writing of the data into disc drives 56A-D and orders the storage locations of the data into disc drives 56A-D from which data is read to convert the data which originally was stored in image processor memory 46 in source fan format to detector fan format upon reading of the data from 56A-D back into memory 46.

FIG. 5 illustrates the ordering of storage locations achieved by controller processing unit 54 in combination with controllers 58A-D. More specifically, FIG. 5 provides one illustrative and nonlimiting example of the manner in which data may be stored, in accordance with the present invention, upon a plurality of disc drives. For purposes of FIG. 5, a CT scanner was assumed to have 6912 source positions, $S_0$ through $S_{6911}$. Accordingly, such a scanner would have at least 6912 samples for each complete cycle of operation. FIG. 5 further assumes the use of 2304 detectors with a limited number of these detectors, on the order of 600, being excited during any one sample. Detector data words of 16 bits in length were assumed and each disc drive 56A-D was assumed to have 7 surfaces, 800 tracks per surface, 32 sectors per track, and the ability to store 256 16 bit detector data words in each sector. Accordingly, for purposes of FIG. 5, discs 56A-D were deemed to have 800 cylinders of 7 tracks (approximately 57K words) per cylinder.

The number of each detector $D_0$ through $D_{2303}$ from which data is obtained is located on the left-hand side of FIG. 5. Along the top of FIG. 5 is an indication of the groups ($G_0$ through $G_{27}$) of source samples $S^0$ through $S_{6911}$, with 298 samples per group. The $DD_{NM}$ notations in FIG. 5 represent disc drives 56A-D of FIG. 4, with the letter N being either 0, 1, 2, or 3 representing disc drive 56A, 56B, 56C, and 56D, respectrvely, and the letter M representing a particular cylinder. Accordingly, $DD_{2,3}$ represents the third cylinder of disc drive 56C in FIG. 4.

As illustrated in FIG. 5, data from detectors $D_{151}$ through $D_{300}$ for the first group $G_0$ of samples $S_0$ through $S_{297}$ is stored in cylinder $0$ of the disc 56A ($DD_{0,0}$). Data from detectors $D_{301}$ through $D_{650}$ for the first group $G_0$ of samples is stored in cylinder $0$ of disc drive 56B ($DD_{1,0}$). Data from detectors $D_{451}$ through $D_{600}$ for the first group $G_0$ of samples is stored in cylinder $0$ of disc drive 56C ($DD_{2,0}$), and data from detector $D_{601}$ through $D_{750}$ for the first group of samples is stored in cylinder $0$ of disc drive 56D ($DD_{3,0}$). Accordingly, processing unit 54 in combination with controllers 58a-58d simultaneously writes data in parallel into the same cylinder of disc drives 56A-D for a first group of sequentially generated samples $S_0$ through $S_{297}$ ($G_0$). More specifically, processing unit 54 in combination with controllers 58A-D write data in parallel from a limited number of detectors (for example detectors $D_{150}$ through $D_{750}$) for a group of samples (for example group $G_{518}$ into the same cylinder (for example cylinder $0$) of each disc drives 56A-D.

In accordance with the present invention, data is written in parallel from a limited number of detectors for a group of sequentially generated samples into the same cylinder of each of a plurality of disc drives in an order which locates the data for select sets of the detectors for a plurality of the groups of the samples in different cylinders of the disc drives for each group. As applied to the illustrative example in FIG. 5, in the second group of sequentially generated samples, $S_{298}$ through $S_{586}$ ($G_1$), data from detectors $D_{301}$ through $D_{450}$ is located into $DD_{2,1}$; from detectors $D_{451}$ through $D_{600}$ is located into $DD_{3,1}$, for detectors $D_{601}$ through $D_{750}$ is located into $DD_{0,1}$ and for at least a portion of detectors $D_{751}$ through $D_{900}$ is located into $DD_{1,1}$. This ordering is continued such that data is located for a select set of detectors, for example detectors $D_{810}$ through $D_{830}$ for a plurality of groups of samples, for example groups of samples $G_2$ through $G_6$, in different cylinders of the discs for each group, namely for group $G_2$ data is located in cylinder 2 of disc drive 56C ($DD_2$ 2), for group $G_3$ data is located into cylinder 3 of disc drive 56D ($DD_3$ 3), for group $G_4$ data is located into cylinder 4 of disc drive 56A ($DD_\emptyset$ 4), for group $G_5$ data is located in cylinder 5 of disc drive 56B ($DD_1$ 5), and for group $G_6$ data is located in cylinder 6 of disc drive 56C ($DD_2$, 6).

Accordingly, when data is read for a select set of detectors, such as detectors $D_{810}$ through $D_{839}$, in parallel from different cylinders of discs 56A–56D into memory 46, this data is automatically read into memory 46 in detector fan format. More specifically, data may be read in parallel from cylinder 2 of disc drive 56C, cylinder 3 of disc drive 56D, cylinder 4 of disc drive 56A, and cylinder 5 of disc drive 56B. In this manner, the data from detectors $D_{810}$ through $D_{839}$ has been converted from source fan format into detector fan format in the sense that for each of detectors D810 through $D_{839}$ data is readily available for each sample in which these detectors participated. It should be noted that this data can be collected with only four rotations of disc drives 56A–D.

The conversion from source fan format to detector fan format may be made essentially complete if at least a partial fan sort is achieved in the process by which data is acquired by data acquisition system 48 and first loaded into image processor memory 46. Specifically, it is preferred that data be loaded into memory 46 from data acquisition system 48 in a manner whereby this data may be stored in a buffer of memory 46 in the format illustrated in FIG. 6 and read from this buffer into the cylinders of disc drives 56A–D in the order illustrated in FIG. 5. More specifically, with regard to FIG. 6 each notation $D_{x,y}$ represents an output signal of a detector X for a given sample Y. Accordingly, $D_{N, \emptyset-63}$ represents the output data for detector number N during samples $\emptyset$ through 63.

As shown in FIG. 6, the output of ten detectors for 153 samples is loaded in buffer addresses in a form which permits this data to be transferred to the first six sectors of a cylinder. Given this data format, upon readout of select sets of detectors in parallel from different cylinders of discs 56A–D, the data accumulated will be substantially in pure detector fan format.

Figure 7:
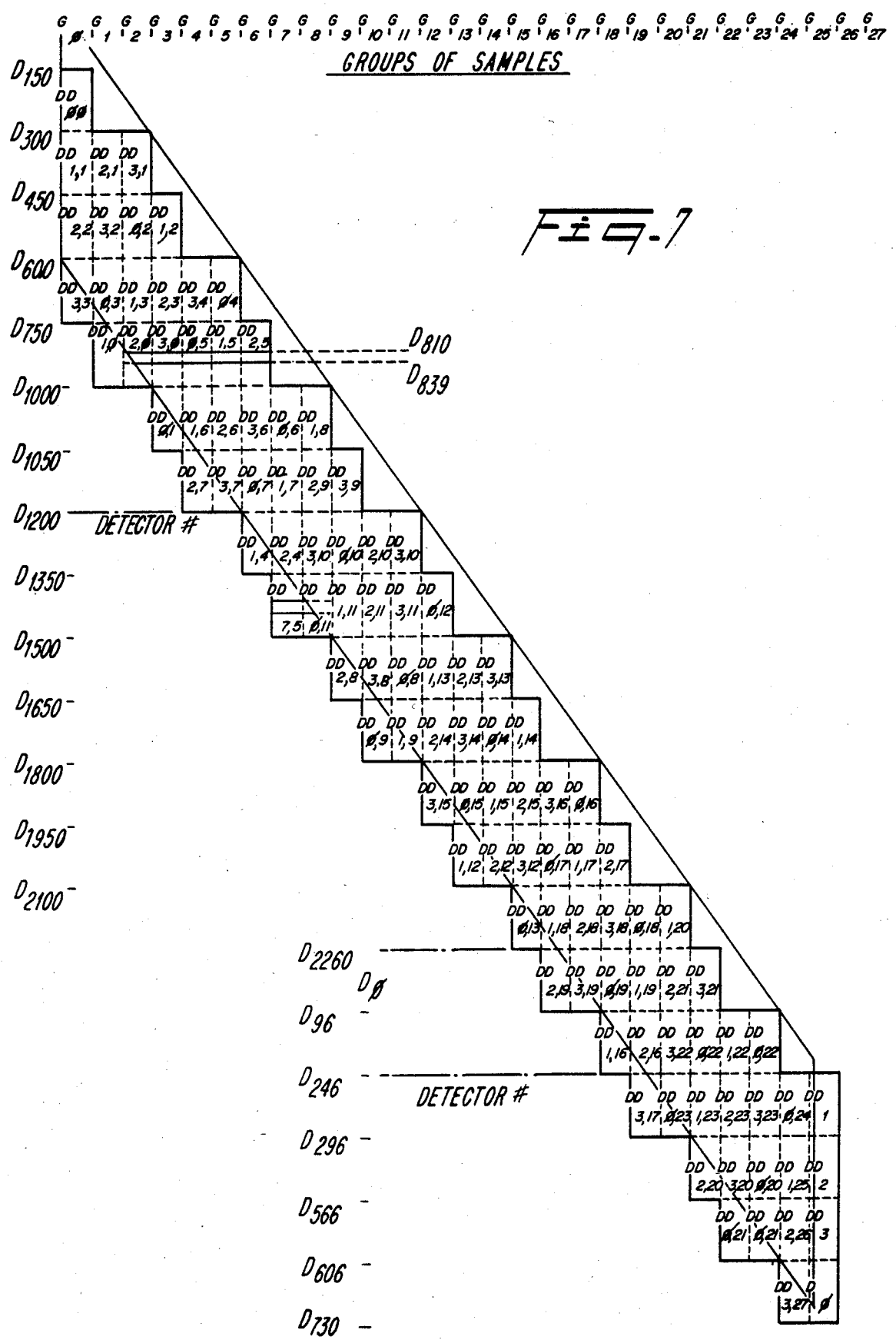
FIG. 7 illustrates data organization in a processor in accordance with another embodiment of the present invention.

An alternative formating of data in disc drives 56A–D is illustrated in FIG. 7. In FIG. 7, processing unit 54 of FIG. 4 in combination with controllers 58A–D writes data from memory 46 in parallel to different cylinders of disc drives 56A–D for any given group of samples. Specifically, for the first group of samples illustrated in FIG. 6 data is written from memory in parallel to cylinders $\emptyset$, 1, 2, and 3 of disc drives 56A ($DD_{\emptyset,O}$), 56B ($DD_{1,1}$), 56C ($DD_{2,2}$), and 56D ($DD_{3,3}$). In a similar manner, data from the remaining groups of samples is loaded into disc drives 56A–D as illustrated in FIG. 6. Accordingly, data is written in parallel from a limited number of detectors for a group of samples, for example detectors $D_{151}$ through $D_{750}$ for group $G_\emptyset$, and detectors $D_{301}$ through $D_{900}$ for group $G_1$ into a different cylinder of each of the discs (as noted above into cylinder $\emptyset$, 1, 2, and 3 of disc drives 56A, B, C, and D, respectively, for the first group of samples $G_\emptyset$ and into cylinders 1, 2, 3, and $\emptyset$ of disc drives 56A, B, C, and D, respectively, for the second group of samples $G_1$) in an order which locates the data for select sets of detectors (such as a select set of detectors $D_{810}$ through $D_{839}$) for a plurality of groups of samples (such as groups of samples $G_2$ through $G_6$) in the same cylinder of the disc drives for each group (cylinder $\emptyset$ for groups $G_2$ and $G_3$, and cylinder 5 for groups $G_4$, $G_5$, and $G_6$). In this manner, data read from disc drives 56A–D for detectors $D_{810}$ through $D_{839}$ in parallel from the same cylinders $\emptyset$ for groups $G_2$ and $G_3$, and 5 for groups $G_4$, $G_5$, and $G_6$ into memory 46 of FIG. 4 is in detector fan format.

Of course, it should be understood that FIGS. 5 and 7 are merely illustrative of two embodiments of the present invention and that the precise numbers used with regard to FIGS. 5 and 7 are by no means intended to be limiting. It should also be understood that although the procedure set forth above with regard to FIGS. 5 and 7 is accurate with respect to detectors $D_{810}$ through $D_{2279}$, for the remaining detector fans, data is positioned at the beginning and end of the file. Using FIG. 5 as an example, reading a block of 30 detectors at the end of the file and 30 detectors from the beginning only yields a data set of 20 complete detector fans. The sequence for detectors $D_{2280}$–$D_{2303}$, and $D_\emptyset$ through $D_{839}$ is:

Seek data drives 0, 1, 2, and 3 to cylinders 20, 21, 22, and 23;

read a track of 20 detectors × 298 samples × 4;

seek drives $\emptyset$ and 1 to cylinders 24 and 25, respectively;

read a track of 20 detectors × 298 samples × 2;

seek drives 1, 2, 3, and $\emptyset$ to cylinders 0, 1, 2, and 3, respectively; and read a track of 20 detectors × 298 samples × 4.

This form of data collection requires six rotations of disc drives 56A–D.

As should be apparent from the foregoing, processing unit 54, in combination with controllers 58A–D, must have the capability of asynchronously operating disc drives 56A–D. A description of a preferred embodiment of processing unit 54 and controllers 58A–D is provided below in connection with FIGS. 8–14.

Figure 8:
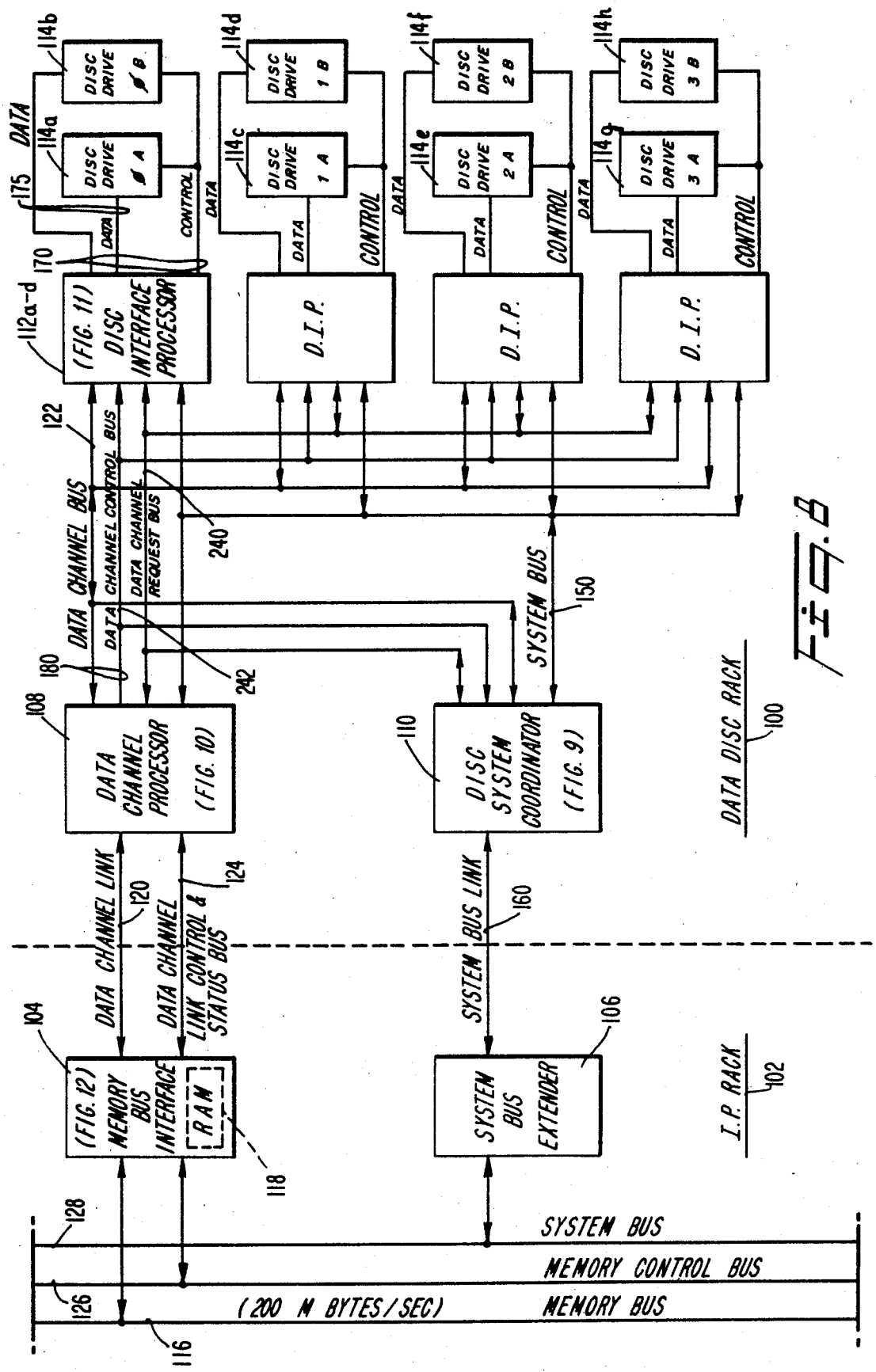
FIG. 8 is a block diagram of an embodiment of a data disc system employing the teachings of the present invention.

FIG. 8 discloses a detailed system block diagram for a data disc system of the subject invention. As is apparent from FIG. 8 the data disc system therein illustrated comprises two physical units, namely a first physical unit contained in a data disc rack 100 and a second physical unit contained in an image processor (IP) rack 102. The contents of data disc rack 100 provide actual storage and disc control hardware, while the contents of IP rack 102 interface the disc hardware with IP memory and control buses. The distance between these two racks may require that the data and control buses be extended over differentially twisted pair cables.

The data disc system illustrated in FIG. 8 comprises five functional units in addition to disc drives 114A–H. These units are memory bus interface 104, system extender 106, data channel processor 108, disc system coordinator 110, and disc interface processors 112A–D.

Memory bus interface 104, in response to commands from data channel processor 108, transfers a block of data (for example 128 bytes) between memory for the IP over memory bus 116 into a local RAM 118 in memory bus interface 104. Data is transferred between the memory for the IP and local RAM 118 at 200 M bytes per second. Data channel link 120 between memory bus interface 104 and data channel processor 108, and data channel bus 122 between data channel processor 108 and disc interface processors 112A–D, both can transfer data at a rate of 20 M bytes per second. Local RAM 118 is sufficient to hold two blocks of data (256 bytes) and is dual ported. Data channel bus 122 and a data channel link control/status line 124, between data channel processor 108 and memory bus interface 118, comprise differentially twisted pair cables.

System bus extender 106 provides a mechanism for an IP memory manager processor (not shown), which coupled to memory bus 116, memory bus 126, and system bus 128, to pass command to and read status from the data disc system illustrated in FIG. 8. System bus extender 106 is also used to down line load programs and data into the data disc system. System bus 128 may, for example, be an Intel Corp. multibus brand system bus.

Disc system coordinator 110 has as a main function to interpret the commands it receives via system bus extender 106 and translate these commands into low level commands for data channel processor 108 and for each disc interface processor 112A-D. During the course of an operation, disc system coordinator 110 monitors the progress of the operation and, if any errors occur disc system coordinator 110, takes corrective action. Disc system coordinator 110 may also provide "power on" diagnostics.

Data channel processor 108, in response to a request for a sector transfer between the IP memory (not shown) and a disc interface processor 112A-D, calculates the IP memory address where data is to be written to or read from. A transfer is then set up using memory bus interface 104. The actual transfer of data between a sector buffer in disc interface processors 112A-D and IP memory may be provided by using a direct memory access (DMA) technique.

Disc interface processors 112A-D perform standard disc controller functions such as seeking, reading, and writing sectors. Disc interface processors 112A-D receive their commands from disc system coordinator 110 and convert these commands into disc drive control signals. When a disc drive 114A-H is ready, disc interface processors 112A-D request a sector transfer from data channel processor 108.

Each of the above mentioned elements will now be described in more detail in connection with FIG. 9-14.

Figure 9:
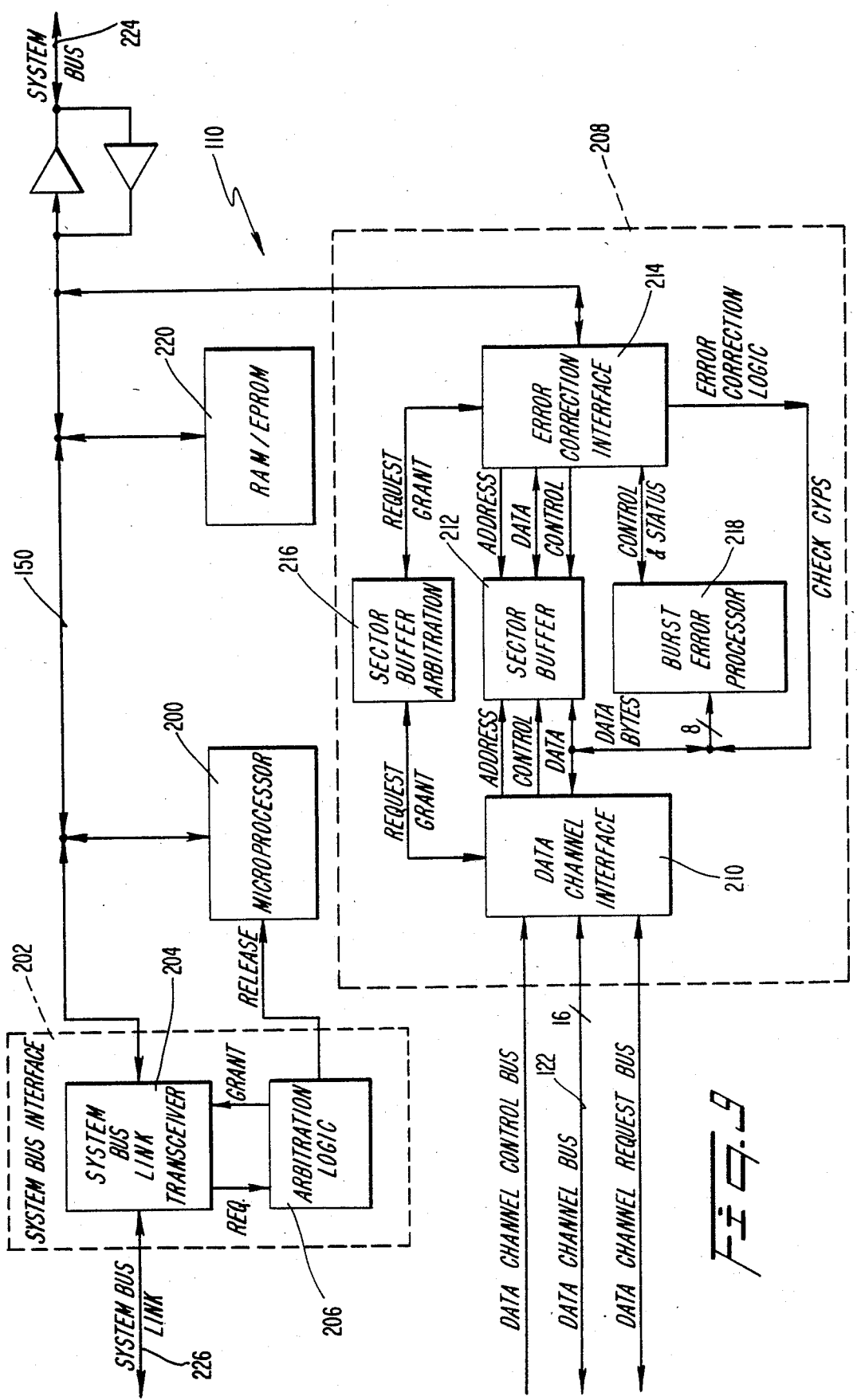
FIG. 9 is a block diagram of a disc system coordinator illustrated in FIG. 8.

FIG. 9 is a block diagram of disc system coordinator 110. Disc system coordinator 110 is responsible for coordinating the activity of all the disc interface processors 112A-D and the data channel processor 108.

A major task of disc system coordinator 110 is to convert a command such as "transfer a file of size S from disc address D to memory address M", into a series of commands and parameters that disc interface processors 112A-D and data channel processor 108 can execute. Disc system coordinator 110 determines how a file is distributed and where a file is located (starting disc address) on disc drives 114A-H. Disc system coordinator 110 also determines the IP memory location where a file is to be transferred. Accordingly, disc system coordinator 110 provides a set of parameters per disc drive 114A-H which parameters are then loaded into data channel processor 108 so that data channel processor 108 can calculate the memory address for every sector of disc drives 114A-G involved in a given file transfer.

Once the location of a file on each disc drive and the length of that file are known, each disc interface processor 112A-D is loaded with a command to transfer sectors containing that file from the calculated disc address. During the file transfer, disc system coordinator 110 monitors each disc interface processor 112A-H for gross failure (i.e., "drive goes not ready") and data errors. Recovery from all errors and faults is attempted and, if not possible, the memory manager processor for the system is notified. Error correction on sectors may be performed by disc system coordinator 110.

As illustrated in FIG. 9, disc system coordinator 110 consists of three functional units' a microprocessor 200 (for example a model 68000) with access to RAM/EPROM 220; system bus interface 202 comprising a multi-bus link transceiver 204 and arbitration logic 206; and error correction logic 208 which includes data channel interface 210, sector buffer 212, error correction interface 214, sector buffer arbitration 216, and burst error processor 218.

Microprocessor 200 is one of two bus masters that sit on system bus 224. Each bus master (the other being system bus interface 202) have the same access to all memory and peripherals.

Microprocessor 200 preferably has 64K words (plus 1 bit parity) of dynamic RAM for program and data storage, and up to 16K words of EPROM in memory 220. EPROM 220 may hold a debug monitor or "power on" diagnostic test.

System bus 224 is buffered before going off-board to become the system bus "down" which all programs, data and commands to data channel processor 108 and disc interface processors 112A-D pass. All controls of data control processor 108 and disc interface processors 112A-D are preferably done using a dual port ROM mapped on to the system bus.

System bus interface 202 is the second (and highest priority) bus master and has the same access that microprocessor 200 has to all memory.

When system bus extender 106 (in IP rack 102 of FIG. 8) detects a "memory request" in the 64K word page allocated to the data disc system in the system memory manager processor, the signal "interface selected" goes active and this initiates a request for system bus interface 202 (in data disc rack 100 of FIG. 8) to become bus master at the next available bus cycle. When the "memory request" is granted, system bus interface 202 connects system bus link 226 to system bus 150 so that address, data and control signals on system bus 128 (FIG. 1) are coupled to system bus 150, and memory locations throughout the data disc system are accessed as desired.

All error correction of sectors read from disc drives 114A-H (FIG. 8) is done under control of disc system coordinator 110. Any disc interface processor 112A-D that reports an error is preferably capable of correcting that error itself. However, this may interrupt the current transfer and, hence, degrade the performance of the system. By allocating error correction to disc system coordinator 106, the overhead of the correction can be hidden under the current transfer and not effect the systems performance.

Three additional mechanisms are necessary to allow disc system coordinator 110 to fully effect this function. These mechanisms are:

a. a method whereby the occurrence of an error can be notified to disc system coordinator 110;

b. an interface to data channel request bus 240 so that a request for the sector in which an error is detected can be made; and c. an interface to data channel 122 and to data channel control bus 242 so that a sector can be transferred between the correction hardware and the main memory.

Once disc system coordinator 110 is notified that an error has occurred, coordinator 110 interrogates the disc interface processor that reported that error (via system bus 224) to find out the sector disc address and the check bytes that indicate the error. Sector buffer 212 (FIG. 9) and burst error processor 218 are ready to receive the sector in error and a request for that sector is made via data channel request bus 240 to data channel processor 108. Sometime later that request is satisfied and the sector is transferred into both sector buffer 210 and burst error processor 218 of disc system coordinator 110 using data channel bus 122 and data channel control bus 242.

Once the sector has been transferred, microprocessor 200 then transfers check bytes associated with that sector into burst error processor 218. A correction algorithm using the burst error processor 218 is then run, and if the sector is corrected successfully, a further request is made to data channel processor, 108 to transfer the corrected sector bacx to memory. If the sector cannot be corrected because the error is too long, then the system memory manager processor is notified.

Every error that occurs is logged so that subsequent maintenance can be taken. If subsequent errors are reported while the current one is being processed, the subsequent errors are queued and dealt with when the correction hardware is free.

Figure 10:
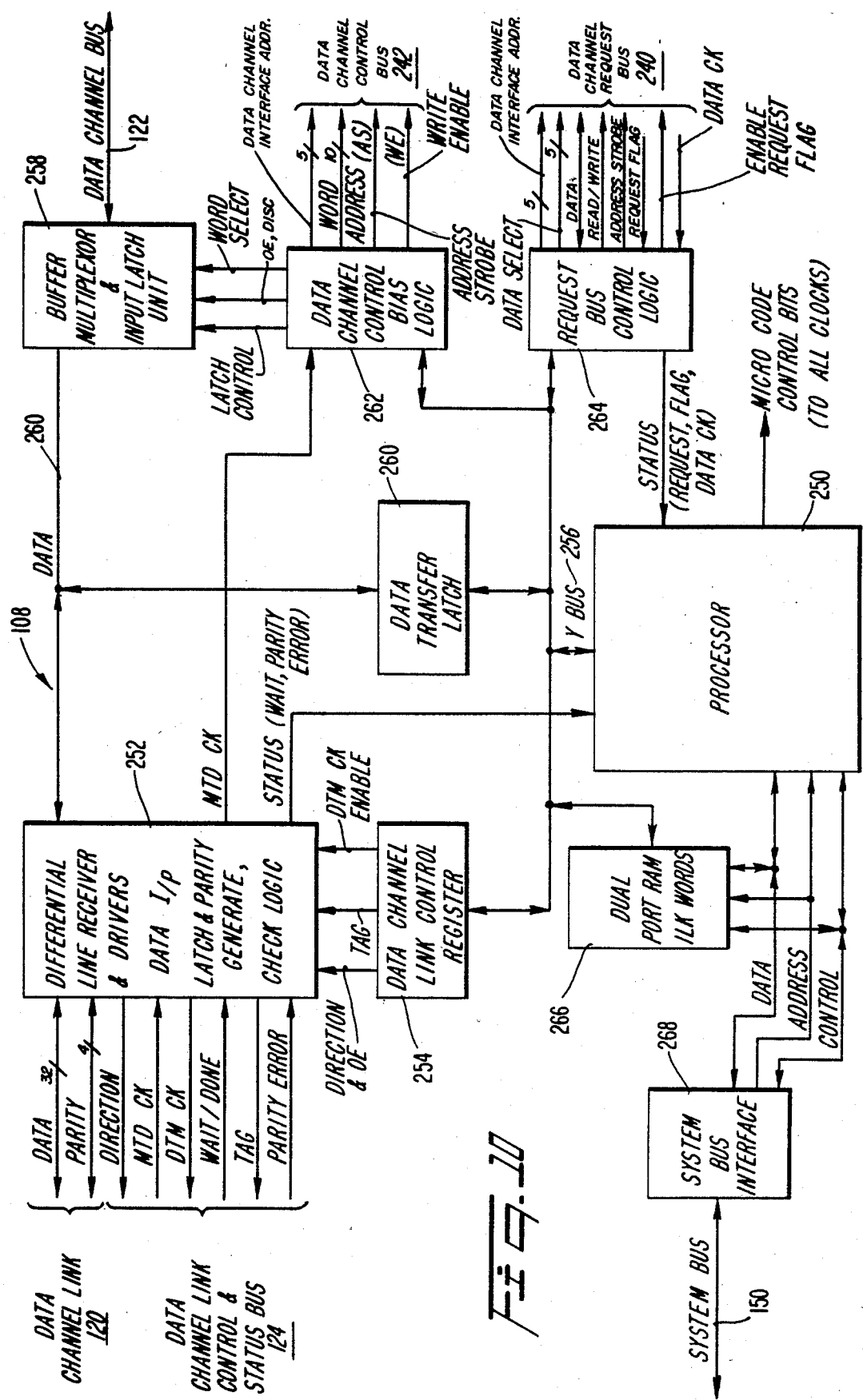
FIG. 10 is a block diagram of a data channel processor illustrated in FIG. 8.

A block diagram of data channel processor 108 (FIG. 8) is illustrated in FIG. 10. Data channel processor 108 calculates the addresses where sectors are to be transferred to or from, and manages that transfer over a differentially twisted pair link (data channel link 120 and data channel link control and status 124) to memory bus 104 and subsequently to IP memory.

The major tasks that data channel processor 108 carries out include:

a. polling around data channel interfaces (described below in connection with FIG. 11) using data channel request bus 240 to examine request flags until one goes active;

b. once a request is made, reading the relative sector address (with respect to the start of the file on that drive), the type of read or write mode and the transfer I.D. from data channel request bus 240. The transfer I.D. is read from bus 240 so that disc system coordinator 110 can request sectors that originated from any drive;

c. using the information found in task (b) above, and data previously loaded by disc system coordinator 110, the address of the memory blocks where the desired sector is to be fetched from or transferred to is calculated;

d. the memory block address, block count and direction of transfer are loaded into memory bus interface 104 (FIG. 8) and the data channel link 120 is set up accordingly;

e. the data channel control bus 240 is set up for the transfer;

f. if the transfer direction is disc to memory, then data (16 bits at a time) is fetched from the selected sector buffer of the respective disc interface processor 112A-D (FIG. 8), packed into long words (32 bits) and passed to memory bus interface 104. Thirty-two bit-long words are passed to memory bus interface 104 where they are assembled into an array of 8 by 128 bits (a memory block) before a block write request is made by memory bus interface 104 to memory control bus 126 (FIG. 1). In the memory bus interface 104 there is sufficient storage (RAM 118) to hold two memory blocks so that while one is being transferred to memory the other is being loaded. A "wait" signal on data channel link control and status bus 124 is checked before loading RAM 118 to verify that RAM 118 is free; and g. if the transfer direction is from IP memory to disc, then all the timing and data originate from memory bus interface 104, and all data channel processor 108 does during the transfer is monitor the signal "done" on data channel link control and status 124.

Once the transfer is completed, data channel processor 108 initiates setting of a "transfer done" flag using data channel control bus 242. All data transfers on data channel link 120 are checked for errors using parity bits, and any errors that occur causing that part of the transfer to be rerun. Errors are logged and, if they start to occur too frequently, data system coordinator 110 is notified. IP memory block addresses are calculated using an addressing algorithm or via a look-up table if a suitable algorithm is not available.

The heart of data channel processor 108 (FIG. 10) is a processor 250 which may, for example, comprise a model 29116 microprocessor. Processor 250 carries out the tasks outlined above. The design of processor 250 is common to the processors found in disc interface processors 112A-D. A description of processor 250 is set forth below with regard to FIG. 13.

With regard to data channel processor 108 as illustrated in FIG. 10, there is shown differential line receiver and driver block 252, data channel link control register 254, multiplexer and input latches 258, data transfer latch 260, data channel control bus logic 262, request bus control logic 264, dual port RAM 266, and system bus interface 268.

Differential line receiver and driver block 252 provides the capacity to send and receive data over distances of 50 to 100 feet at 5 MHz, buffers the data channel bus 124 through a set of latches, and checks for errors in transmission of data across data channel link 120.

Data channel link control register 254 provides control and timing signals for data channel link 120 and also controls the direction of data on data channel link 120. These control and timing signals are provided under the control of processor 250 over Y bus 256.

Buffer multiplexers and input latches 258 reduce 32 bit data channel bus 260, between data channel link control register 254 and unit 258, into 16 bit data channel bus 222. Bus 222 has twice the band width for distribution and sufficient drive capability for all disc interface processors 112A-D and for disc system coordinator 110. Also, two 16 bit words are packed into one 32 bit long word when data is received by unit 258 from a data disc interface processor 112A-D or from disc system coordinator 110.

Data transfer latch 260 is included to simplify debugging of the system because latch 260 allows processor 250 to be the source or destination of data rather than just controlling the transmission medium.

Data channel control bus logic 262 is responsible for generating signals that control the reading and writing of data between a specified sector buffer of disc interface processors 112A-D and data channel bus 122. A data channel interface address from logic 262 specifies the locations of the sector buffer and a word address from logic 262 identifies individual locations within a sector buffer. Control signals for the buffer, multiplexers, and input latches are also generated by logic 262. If a transfer is from disc to IP memory, then the timing of control signals is derived by processor 250. Otherwise, when the transfer is from memory to disc, control signals are derived in memory bus interface 104.

Request bus control logic 264 allows the data channel processor 108 to poll around the disc interface processors 112A–D and disc system coordinator 110 to find if any requests are outstanding. When such a request is found, logic 264 reads the necessary parameters to implement that request.

Dual port RAM 266 is used by processor 250 to hold scratch data, lookup tables, and commands loaded by disc system coordinator 110. Duel port RAM 260 is preferably 16K words in size. Each disc interface processor 112A–D has an area of RAM 266 allocated to it for its own tables and scratch area. RAM 266 is dual ported in that processor 250 always has priority, and has access on demand, while disc system coordinator 110 has asynchronous access. The microcode for processor 250 should be written in such a way that disc system coordinator 110 is not forced to wait too long to be granted access.

System bus interface 268 supplies a data path between dual port RAM 266, a writable control store in processor 250, and disc system coordinator 110 via system bus 150. System bus interface 268 decodes the necessary addresses and contains a control and status register that controls the major operation of processor 250 during testing and initial program loading. Interrupt logic is also included.

Figure 11:
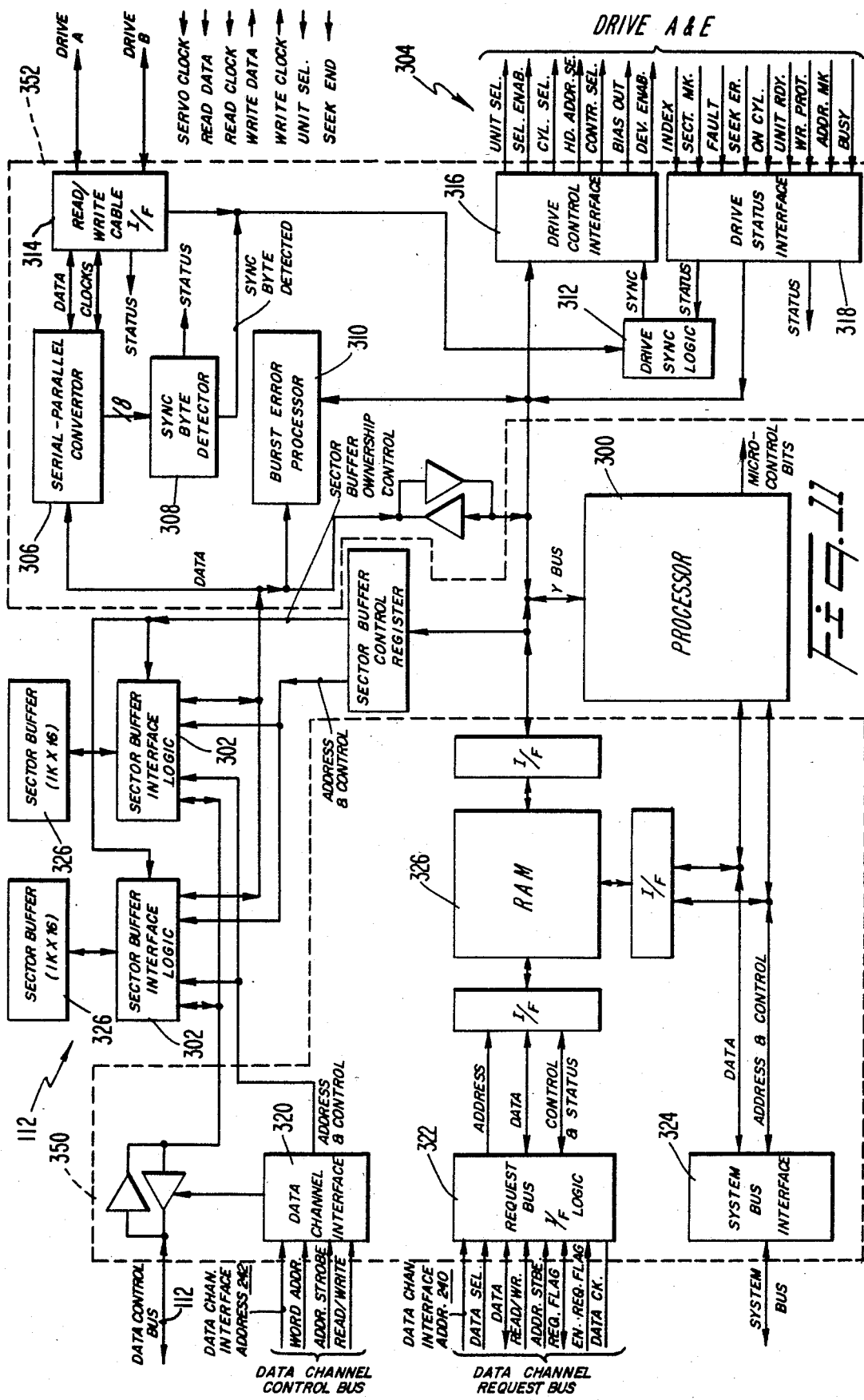
FIG. 11 is a block diagram of a disc interface processor illustrated in FIG. 8.

A block diagram of a disc interface processor 112 is illustrated in FIG. 11. Each disc interface processor 112 can control up to two disc drives 114A–H (FIG. 8). Moreover, each disc interface processor 112 performs standard disc controller functions such as seeking, reading and writing sectors, and formatting. Each disc interface processor 112 also provides additional intelligent operations such as multiple sector transfers across track and cylinder boundaries, logical to physical track mapping to bypass bad tracks, and automatic re-tries.

All control of a disc drive 114A–H may be by the industrial standard storage module disc (SMD) interface and all drive parameters (storage and timing) are preferably under microcode control to allow any SMD compatible disc drive to be used.

The main controlling element of each disc interface processor 112 is based around a bipolar processor 300. Processor 300 may, for example, be a model AM29116 microprocessor. Processor 300 does the following major control tasks:

a. interprets commands given by the disc system coordinator 110 and translates these commands into disc movements;
b. makes requests to the data channel processor 108 to fill or empty sector buffers 302 of a disc interface processor 112;
c. monitors the discs' status lines and manipulates disc control lines 304 to satisfy SMD timing specifications;
d. reads (and writes during formatting) sector headers and verifies that the correct sector has been reached before a read or write operation is allowed to start;
e. controls the transfer of data to and from sector buffers 205 of a disc interface processor 112 and the parallel-to-serial, serial-to-parallel convertors 306 of a disc interface processor 112; and
f. controls error correction and detection logic.

The block diagram for a disc interface processor 112, as shown in FIG. 11 may be split approximately down the center with the left side concerned with interfacing the disc system coordinator 110 and data channel processor 108 (DSC/DCP interface 350), and with the right side interfacing to disc drives 114A–H (disc interface 352). Sector buffers 302 link the two sides together.

Disc interface 352 includes parallel-to-serial and serial-to-parallel convertors 306, sync byte detector 308, burst error processor and control logic 310, drive sync logic 312, read/write cable interface 314, drive control interface 316, and drive status interface 318.

Parallel-to-serial and serial-to-parallel convertors 306 convert 8 bit wide data bytes into a serial non-return to zero (NRZ) data stream when writing a disc drive 114, and a serial NRZ data stream to 8 bit parallel data when reading from a disc drive 114. Both byte input and output are double buffered to ease the response time of processor 300 to demands to transfer the next data word. Data overrun and data underrun errors are also flagged.

As will be discussed below with regard to FIG. 14, the header or data fields of each sector are preceded by a series of zero bytes and a sync byte. The purpose of the field of zeros is to allow phase locked oscillators (PLO's) in disc drives 114A–H time to "lock on" to a known pattern (zeros in this case). A separator between this field of zeros and the header or data field that follows is a sync byte. The sync byte is a known pattern of ones and zeros. When a sync byte is detected by sync byte detector 308, the serial-to-parallel convertors 306 start blocking the serial data stream into 8 bit bytes and processor 300 then starts processing these words.

Burst error processor 310 and associated control logic is used to calculate the check bytes for a data field of each sector and to append these check bytes at the end of a data field so that on a subsequent read, any corruptions of the data field can be detected and corrected. When an error is detected, the actual correction is done in disc system coordinator 110.

Error detection for a sector header is done in a slightly different manner because the integrated circuit at the heart of burst error processor 310 logic will only produce a minimum cyclic redundant check (CRC) of 32 bits, whereas a 16 bit CRC is used in the sector header. When reading a sector header, a separate CRC generator is used, and when writing the header (which only happens during disc formatting) the CRC is calculated by processor 300.

Drive sync logic 312 allows processor 300 and the disc drives 114 it is controlling to run asynchronously from each other. Drive sync logic 312 provides the ability to load drive control interface 316 (and, hence, change the command to a disc drive) a specific number of servo cycles after an event, such as, a sector or index pulse occurring. Accordingly, drive sync logic 312 simply needs to count the number of servo cycles after an event and report reaching that given number of cycles to drive control interface 316.

An alternative embodiment of drive sync logic 312 could use a servo clock that each disc drive 114 generates as a master clock (at least during disc drive controlling activities) for the disc interface processors 112A–D. However, this embodiment has the problem of switching between the asynchronous clocks of each disc drive 114A–H and having the controller "hang up" due to disc drive or cable failure or shutdown. Also the servo clock frequency of each disc drive 114A–H changes as the rotation speed of the disc drives change, and substituting a different disc drive could change the servo clock frequency as well. Accordingly, a count of servo cycles is preferred.

Read/write cable interface 314 accepts signals from a pair of disc drives 114 (radially) and selects one set or the other depending on which of the drives is designated as "on line."

Drive control interface 316 consists of two registers in series, the first register being loaded under the control of processor 300 and the contents of this register being transferred to the second under control of drive sync logic 312. The output of the second register is driven onto control cable 304 which is daisy chained between two disc drives 114.

Drive status interface 118 receives a status report from a selected disc drive 114 and allows processor 300 to read and test this report. Several status lines can be used by sync drive logic 312 as an "event strobe."

The disc system coordinator and data channel processor interface side of each disc interface processor 112 (DSC/DCP interface 350 of FIG. 11) includes data channel interface 320, requests bus interface logic 322, system bus interface 324, and triport RAM 326.

Data channel interface 320 provides a data path and control logic for data channel processor 108 to read and write to sector buffers 326 of each disc interface processor 122A–D. Data transfers are synchronous and under control of data channel processor 108 and occur at the rate of 20M bytes per second (one word every 100 nanoseconds).

Request bus interface logic 322 gives data channel processor 108 access into triport RAM 326 to extract transfer parameters and to examine a separate request flag. Access to triport RAM 326 is asynchronous, while the reading of the request flag is synchronous to the timing in the data channel processor 108.

System bus interface 324 provides a data path between disc system coordinator 110 and dual port RAM 266 and writable control store of data channel processor 108 via the system bus 150. Interface 324 decodes the necessary addresses and contains control and status registers which control the major operation of processor 300 during testing and initial loading. These command/status registers are also used for fast communication of control and status information. Accordingly, during polling, a high access duty cycle is not imposed on triport RAM 326. Interrupt logic may also be included.

Triport RAM 326 is the main channel of communication between a disc interface processor 112, disc system coordinator 110, and data channel processor 108. RAM 326 holds transfer parameters for data channel processor 108 and command and status information to and from disc system coordinator 110. Processor 300 uses triport RAM 326 for scratch storage and also for a logical-to-physical track map so that bad tracks can be avoided. The size of RAM 326 is preferably 16K words, and to keep arbitration logic simple, processor 300 preferably always has access on demand. The remaining two ports of RAM 326 compete on a first come, first serve basis for the remaining cycles. The two competing ports are asynchronous and a microcode program running in disc interface processors 112 should be written so as not to lock the other ports out for long periods of time.

Sector buffers 302 of a disc interface processor 112 of FIG. 11 link data channel bus 122 to disc interface 352. Sector buffers 302 are double buffered so that while one buffer is used in a transfer with a disc drive, the other is being filled or emptied by disc channel coordinator 108. The size of each sector buffer 102 is preferably 1K words, which limits the maximum sector size to 2K bytes. The transfer band width is preferably 20M bytes per second (one word every 100 nanoseconds). This high band width is required by data channel bus 122.

Each sector buffer 302 has two sources of addresses, data and control, namely: (i) data channel processor 108 and memory bus interface 104 and (ii) processor 300 and disc interface 352. Data channel processor 108 provides address and control signals during data transfers between sector buffers 302 and memory bus interface 104. During sector buffer to disc transfers, processor 300 generates address and control signals to control the flow of data.

Although sector buffers 302 are both dual ported, only one of these ports has access for the duration of its operation, and the allocation of access to a particular port is controlled by processor 300.

Figure 12:
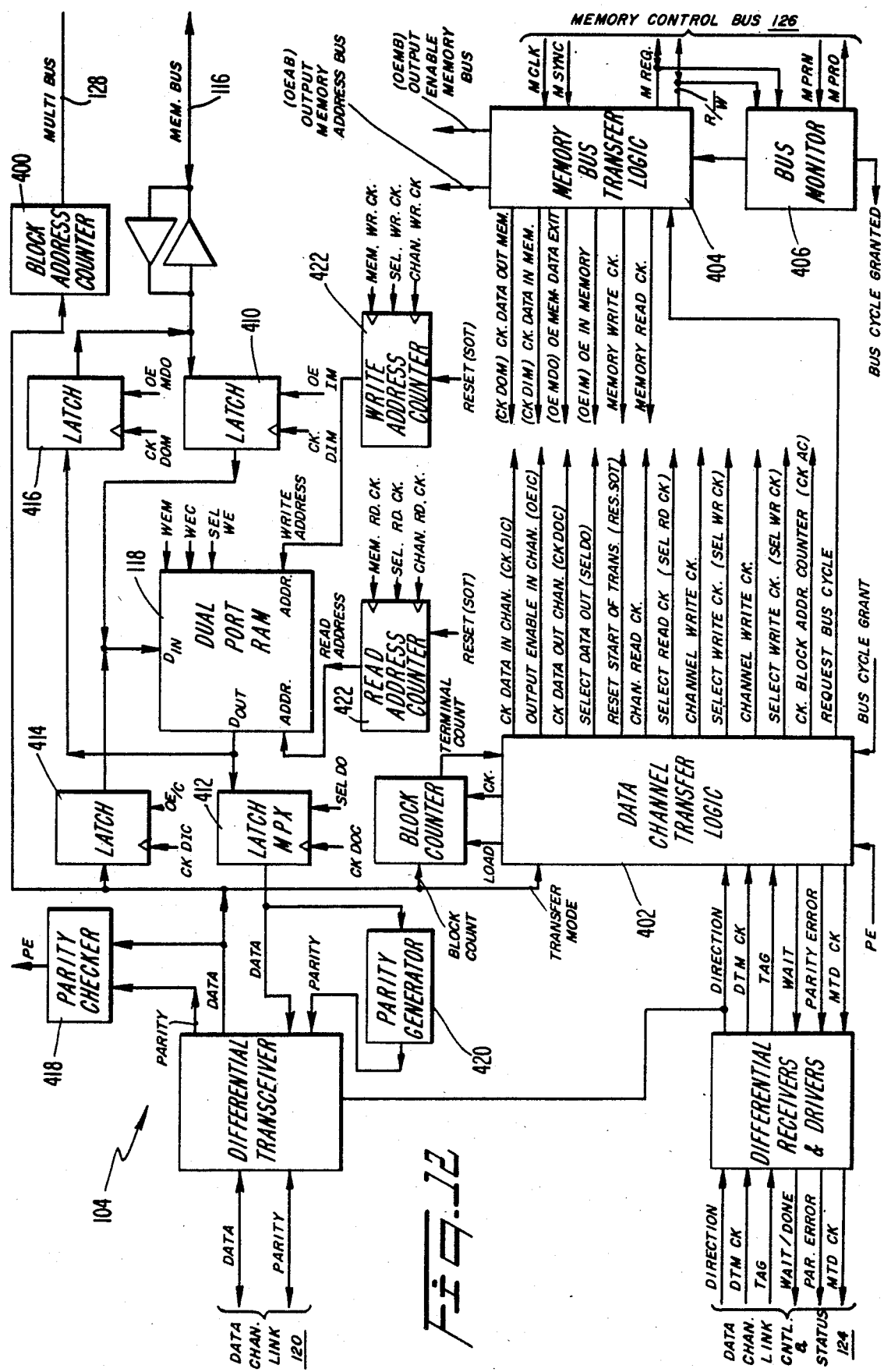
FIG. 12 is a block diagram of a memory bus interface illustrated in FIG. 11.

A block diagram of memory bus interface 104 (FIG. 8) is illustrated in FIG. 12. Memory bus interface 104 operates to transfer data between a high speed (200M byte per second) block mode bus (memory bus 116) and the interrack data link 120 at 20M bytes per second. Data channel processor 108 first sets up data channel link 120 to load memory bus interface 104 with: the start address of a group of memory blocks to read or write; (24 bit address allowed); the number of blocks to transfer (max 15); and a read or write command.

If the transfer is from IP memory to disc, then memory bus interface 104 immediately requests a read of the specific IP memory block. Memory data from this read request is stored in latch 410 and then loaded into dual port RAM 118 in memory bus interface 104. Once this occurs and there is room for another block of data in dual port RAM 118, and if a block counter of memory bus interface 104 is not zero, then another request is made for a further block of data. Meanwhile, the block of data that is in RAM 118 is transferred back to data channel processor 108, 32 bits at a time, every 200 nanoseconds through latch/multiplexer 412. A clock that is transmitted with the data is used in the data channel processor 108 to store the data into latches and also multiplex the 32 bits into 16 bit data bus 122. This sequence continues until all the blocks have been transmitted to data channel processor 108 and then a "done" signal is activated.

If the transfer is from disc to memory, then data channel processor 108 transfers a block of data through latch 414 into dual port RAM 118. Memory bus interface 104 detects when this has occurred and makes a write bus request which, when satisfied, writes the data block through latch 416 into IP memory. Meanwhile if there is room for another block of data in the dual port RAM 118 (indicated to data channel processor 108 by the "wait" line of bus 124 being inactive, and the whole sector has not been transferred), then the data channel processor 108 transfers more data down into dual port RAM 118. This processor continues until the sector is transferred.

Parity is generated for data sent to data channel processor 108 and checked for data sent from data channel processor 108. Parity checker 118 checks parity errors in data transferred to memory bus interface 104. Parity generator 420 generates parity for data transmitted from memory bus interface 104.

The design of memory bus interface 104 is largely determined by the availability of suitable dual port RAMs. A single write port and a single read port device may be used to give 16×4 bits of storage. Thirty-two such devices may be used to give 16×128 bits of storage which is enough for two data blocks.

Due to the dedicated read port and the dedicated write port, there is logic from channel transfer logic 402 to route the memory bus and data channel to the required port depending on the transfer direction. Data channel transfer logic 402 also does a conversion between a 32 bit bus and a 128 bit bus that goes into RAM 118.

The read port address counter 422 and the write port address counter 424 each are clocked by data channel transfer logic 402 or memory bus transfer logic 404 depending on the direction of transfer. Memory bus transfer logic 408 controls the transfer of data between dual port RAM 118 and memory bus 116, when a bus cycle has been granted.

Bus monitor 406 generates a request for a bus cycle, and by monitoring bus requests by other interfaces, can determine when its request is granted and then prompt the memory bus transfer logic to do the transfer.

Data channel transfer logic 402 looks after the timing of transfers between data channel link 120 and dual port RAM 118, and the multiplexing/demultiplexing of the 32 bit bus between the 128 bit bus. Logic 402 also looks after the higher levels of transfer, such as causing bus cycles to be requested, keeping track of the number of blocks transferred, and setting up logic in memory bus interface 104 to do that transfer.

The system described in FIGS. 8-12 employs a number of signals over data channel and data control bus 180, data channel requests bus 240, system bus 150, data channel link control bus 124, SMD bus (control and data) 170 and system bus link 160.

Data channel and data channel control bus 180 is used to transfer data between data channel processor 108 and sector buffers used in disc interface processors 112A-D and disc system coordinator 110. Bus 108 is divided into two sections: (a) data channel bus 122 that carries data; and (b) control bus 242 that determines where data originated from or is going to and the read/write mode. Data channel bus 122 is preferably 16 bits wide and is bi-directional. Control bus 242 carries the following signals which are all generated in the data control processor 108:

(a) Data channel interface address (5 bits). This identifies which sector buffer is involved in a transfer.
(b) Word address (10 bits). This selects which location in the selected sector buffer will be written to or read from.
(c) Write enable. This line goes active to store data on the data channel into the address specified by the word address. When this line is inactive the contents of the specified location are placed into the data channel.
(d) Address strobe. This is active when a valid interface address is present on the bus.

Data channel request bus 240 is used by the data channel processor 108 to poll around the disc interface processors 112A-D and the disc system coordinator 110 to see if a sector is being requested. If a sector is being requested, then bus 240 is used to read the transfer parameters. Bus 240 operates in a synchronous mode while reading and writing a request flag and in a asynchronous mode when reading the transfer parameters.

The following signals are used for synchronous operation:
(a) data channel interface address;
(b) write enable;
(c) address strobe;
(d) request flag; and
(e) enable request flag.

The following signals are used for asynchronous operation:
(a) data channel interface address;
(b) data select;
(c) data (bi-directional);
(d) write enable;
(e) address strobe;
(f) enable request flag; and
(g) data transfer acknowledge.

A data channel interface address is 5 bits long. This address selects which request bus interface responds to commands occurring over the other bus signals. The data select signal is 5 bits long. This selects which word of a transfer data is being read or written to. The data (bi-directional) signal is 16 bits long and is used to pass transfer parameters between data channel processor 108 and disc interface processors 112A-D. When the write enable signal is active, data on data channel bus 122 is written into a specified location and when inactive, data from the specified location in the write enable signal is placed on data channel bus 122. An address strobe signal indicates when a valid interface address is present on data channel control bus 242. A request flag signal is returned by a selected interface (when enabled) and when active indicates that a request is pending. An enable request flag signal, when active, directs the selective interface to enable the request flag onto the request flag line, otherwise, data channel bus 122 is enabled. In either case, the write enable signal controls the direction of transfer on the request flag line or data bus. A data transfer acknowledge signal is returned by the selected interface to inform the data channel processor 108 that the interface has finished with the data (write operation) or that the data is now available on the data bus (read operation).

Bus 150 is a buffered version of a processor 200 bus (a 68,000 processor bus, for example) and is used by data system coordinator 110 to load programs in the writable control store of processor 250. System bus 150 is also used by the disc system coordinator 110 to load up commands and parameters, and to return status.

Data channel link control and status bus 124 controls data transfer over the 32 bit data channel link 120 between data channel processor 108 and memory bus interface 104. The following signals make up data channel link control and status bus 124:
(a) A direction signal which defines the direction of data flow on data channel link 120 and is used to enable and disable line receivers and drivers at both ends of data channel link 120;
(b) memory to disc clock signal which is active only when data is being transferred from memory to the disc system and its active edges occurs in the center of the data to allow for skew. This signal is used at the receiving end (data channel processor 108) to latch-in data and to multiplex data into a 16 bit bus;
(c) a wait/done signal which serves two uses. When data is transferred from data channel processor 108 to memory bus interface 104, the "wait" signal inhibits the data channel processor 108 from transferring any more data because RAM buffer 118 in memory bus interface 104 is full. In the case of a transfer from memory bus interface 104 to data channel processor 108, the data channel processor 108 can cope with the maximum data rate from the memory bus interface but cannot keep track of how much data has been transferred. A "done" signal tells the data channel processor 108 that the data transfer has now finished and that the memory bus interface is ready for the next command;

(d) a tag signal on the data channel link is used to transfer data and also command/address information. This signal differentiates between transfer of data and command/address information;

(e) a parity error is the output of parity checker 418 (FIG. 12) in memory bus interface 104 and goes active if any parity errors occur in the IP memory transfer; and (f) a disc to memory clock signal is active only when data is transferred from disc to IP memory or command/address information is sent to the memory bus interface 104 and is used to latch data into memory bus interface 104.

SMD bus (control and data) 170 connects up 2 disc drives 114 to a disc interface processor 112 and comprises 2 separate cables: control cable 304 and read-/write cable 175 (FIG. 8). Control cable 304 is daisy chained between the disc interface processor 112 and both disc drives 114 coupled to that disc interface processor, while the read/write cable 175 is distributed radially to each disc drive 114, i.e., one cable per drive.

System bus link 160 extends a sub-set of a multi-bus in the IP memory rack (not shown) into the data disc system rack 100. Several decoded signals are used to make the interface easier. These signals include an address bus (16 bits); bi-directional data bus (16 bits); write enable; address strobe; data transfer acknowledge; page register select; and interrupt.

All the signal functions are standard Multibus TM ones except the page register select signal which, when active, loads the content of data bus 160 (part of system bus link) into a page register on the disc system coordinator 110.

Figure 13:
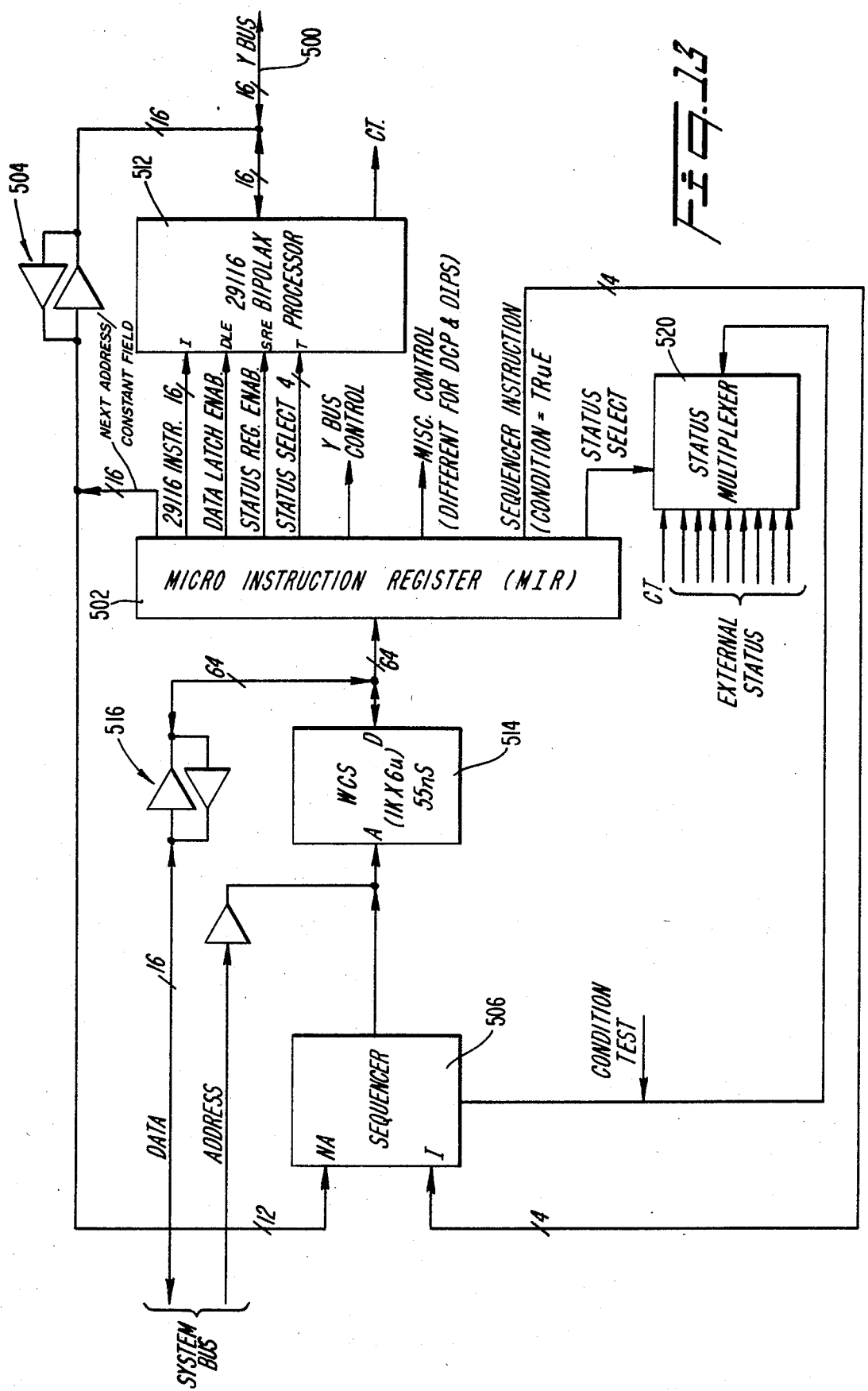
FIG. 13 is a block diagram of the processor illustrated in the disc system coordinator illustrated in FIG. 8 and in the disc interface processor illustrated in FIG. 11.

Processors 250 and 300 used in disc interface processors 112 and disc system coordinator 110 are responsible for the flexibility of the overall system through changes in software (microcode). Each processor 250 and 300 may be based around a AMD29116 bipolar processor 512 as shown in FIG. 13. Each processor 250 and 300 may be cycled in 200 nanoseconds. The next micro-instruction is pipelined in micro-instruction register 502. Micro-instructions are stored and read from writable control store 514. Writable control store 514 is loaded or examined from the system bus to transceivers 516 and 518. The main communications path between processor 512 and the rest of the disc interface processor or data channel processor logic is a bi-directional Y bus 500 (FIG. 13). It should be noted that Y bus 500 is linked to a micro-instruction address register 502, via a set of transceivers 504, and this gives several important facilities namely:

a. the next address field (where jump and subroutine addresses are held) can be used to hold constant data for use in the processor;

b. this field can hold control bit patterns that can be loaded directly into a receiving register without going through the processor;

c. immediate operands can be passed to the processors without using a two cycle immediate operand instruction in the processor; and d. the processor (or anything on Y bus 500) can provide the next address so "computer go to or multiway branches" can be implemented.

Sequencer 506 (FIG. 13) may, for example, be a model AM2910. The branching status is selected by status multiplexers 520 and the status select field of the micro-instruction.

Figure 14:
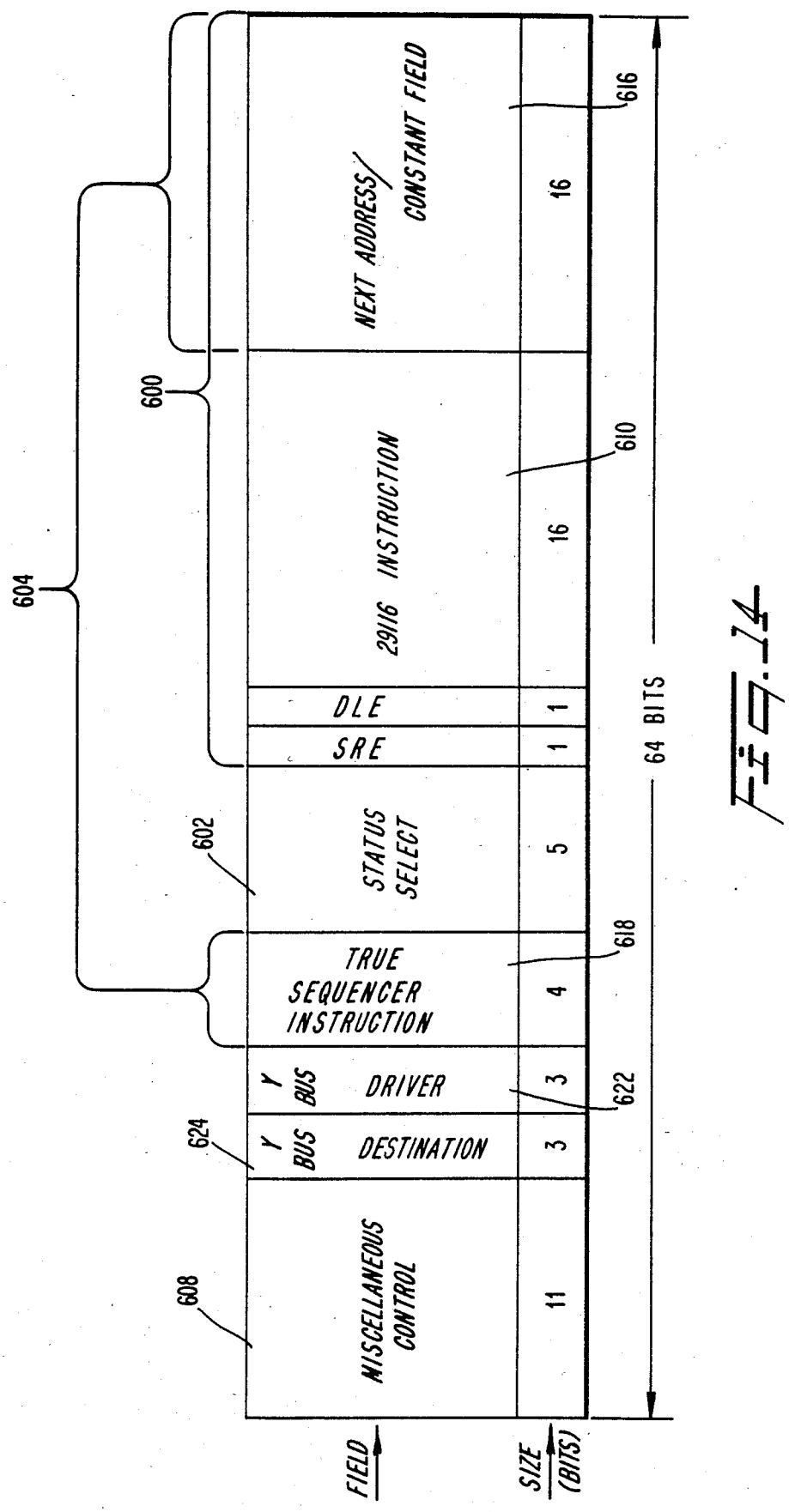
FIG. 14 is an illustration of the format of a microcode instruction employed in connection with the processor illustrated in FIG. 13.

As shown in FIG. 14, a micro-instruction for processors 250, 300 consists of 5 fields: processor control field 600; status select field 602; sequencer field 604; Y bus control field 606; and miscellaneous field 608.

Processor control field 600 is divided into instruction 610, data latch enable (DLE) 612, status register enable (SRE) 614, and constant field 616 (shared with the sequencer as the next address field). Processor control field 16 defines what processors 250, 300 are doing that cycle.

The status select field 602 defines which status bit (external) or condition code is applied to the sequencer instruction select multiplexer 105 (FIG. 13) for use with a conditional instruction.

Sequencer field 604 is divided into sequencer instruction 618 and next address 616. The Y bus field 606 is divided into Y bus driver 622, and Y bus destination 624. The driver 622 subfield determines which source drives the Y bus (i.e. provides the data). The Y bus destination 624 controls which destination port latches in the data presented on Y bus 500 (FIG. 13).

Miscellaneous field 608 may be different for disc interface processors 112 and data channel processor 108 and may cover all the microcode lines that do not readily fit into the above categories.

In summary, the disc system of the subject invention is designed to meet the requirements of modern fourth generation CT scanners. These requirements are to provide a large volume of storage with a high transfer rate. The system is implemented from standard "Winchester" disc drives which are controlled by a custom design controller. The controller uses microprocessors to provide flexibility and intelligence. This enables the system to be driven by high level commands, thus reducing the software effort required to use the disc system.

Fourth generation CT scanners produce data organized in source fan format which must be reorganized into data fans before this data can be used in standard image processing reconstruction algorithms. In extended performance CT systems, the image reconstruction time may be reduced to the range of 5 to 10 seconds. For this level of performance, the disc time required to reorder the data using a conventional controller may exceed processing time by a factor of two. Several key features of the subject disc system eliminate this potential problem.

These features include a system transfer rate which is increased by a factor of N by simultaneously transferring to N drives in parallel. In the past, this approach used rotational synchronization of all end disc drives. The subject disc drive system eliminates this need for spindle synchronization by using an intelligent data management controller. The data management controller of the subject disc system monitors the rotational position of each drive and arranges to transfer the correct data to each drive. Sustained transfer rates are maximized because the controller immediately begins transferring data after seeking instead of waiting for an index sector to come under the heads.

Furthermore, the subject system can provide an intermediate step in the data reordering process which formerly required the power and memory of a large computer system. This is possible because of the controllers' unique ability to transfer to completely independent tracks and surfaces on each drive at the same time. Presorted data is written to the disc system from the memory system. When the data is read back from disc, proper selection of track and surface number on each drive will result in completely sorted data being written to the memory system in detector fan format.

The modular design of the control system of the subject invention allows for incremental expansion of storage space, the transfer rate, or both. This is possible because, during a transfer, blocks of memory space will be transferred to a single disc drive instead of being distributed among all drives in the system.

Additional advantages and modifications will readily occur to those skilled in the art. The invention, in its broader aspect is not, therefore, limited to the specific details, representative methods, and illustrative examples shown and described. Accordingly, departures may be made from such details without departing from the spirit or scope of applicants' general inventive concept.

We claim:

1. A data disc system for a computed tomography X-ray scanner having a plurality of detectors, a source of X-rays movable relative to said detectors, and a memory unit which receives data from said detectors in source fan format, namely a format in which data from multiple detectors is referenced to a single source position, said system comprising:
    (a) a plurality of disc drives each having a plurality of ordered cylinders; and
    (b) processor means for writing said data from said memory unit into said disc drives and for reading data from said disc drives back into said memory unit, said processor means ordering the storage locations of said data in said disc drives into which said data is written with at least a portion of said source fan format data for each source location stored in a different one of said disc drives, and ordering the storage locations of said data in said disc drives from which said data is read to convert said data from source fan format to detector fan format, namely a format in which data from multiple source positions is referenced to a single detector, upon said reading of said data from said disc drives into said memory unit, with at least a portion of said detector fan format data for each detector being read from a different one of said disc drives.

2. The data disc system of claim 1 wherein said processor means includes means for asynchronously operating said disc drives.

3. The data disc system of claim 2 wherein said processor means writes data in parallel into the same cylinder of different ones of said disc drives.

4. The data disc system of claims 2 or 3 wherein said processor means reads data in parallel from different cylinders of different ones of said disc drives into said memory unit.

5. The data disc system of claim 2 wherein said processor means writes data from said memory unit in parallel to different cylinders of different ones of said disc drives.

6. The data disc system of claims 2 or 5 wherein said processor means reads data in parallel from the same cylinder of different ones of said disc drives into said memory unit.

7. A data disc system for a computed tomography X-ray scanner having a plurality of detectors, a source of X-rays which is moveable with respect to said detectors and which generates a plurality of samples for each cycle of operation, with a limited number of said detectors being excited during any one sample, and a memory unit for receiving data from said detectors in source fan format, namely a format in which data from multiple detectors is referenced to a single source position, said system comprising:
    (a) a plurality of disc drives each having a plurality of ordered cylinders; and
    (b) processor means for:
        (i) writing data in parallel from said limited number of detectors for a group of sequentially generated samples stored in said memory unit into the same cylinder of each of said disc drives in an order which locates the data for select sets of said detectors for a plurality of said groups of said samples in different cylinders of said disc drives for each group; and
        (ii) reading data for said select sets of said detectors in parallel from different cylinders of said disc drives back into said memory unit in detector fan format, namely a format in which data from multiple source positions is referenced to a single detector.

8. A data disc system for a computed tomography X-ray scanner having a plurality of detectors, a source of X-rays which is movable with respect to said detectors and which generates a plurality of samples for each cycle of operation, with a limited number of said detectors being excited during any one sample, and a memory unit for receiving data from said detectors in source fan format, namely a format in which data from multiple detectors is referenced to a single source position, said system comprising:
    (a) a plurality of disc drives each having a plurality of ordered cylinders; and
    (b) processor means for:
        (i) writing data in parallel from said limited number of detectors for a group of sequentially generated samples stored in said memory unit into different cylinders of each of said disc drives in an order which locates the data for select sets of said detectors for a plurality of said groups of samples in the same cylinder of said disc drives for each group; and
        (ii) reading data for said select sets of said detectors in parallel from the same cylinder of said discs into said memory unit in detector fan format, namely a format in which data from multiple source positions is referenced to a single detector.

9. The data disc system of claim 7 or 8 wherein said processor means include a plurality of disc interface processors, with each disc interface processor associated with at least one of said disc drives to control operation of said disc drives.

10. The data disc system of claim 9 wherein said system includes an image processor for constructing output signals which represent an image of a target being scanned by said system, said image processor constructing an output signal from data signals organized in detector fan format.

11. The data disc system of claim 10 wherein said processor means includes a data channel processor and disc system coordinator coupled between said image processor and said interface processors, said data channel processor and disc system coordinator controlling operation of said disc interface processors independent of said image processor.

12. The data disc system of claim 11 wherein said disc interface processors each include means for operating the disc drives associated with that disc interface processor asynchronously from disc drives associated with the other disc interface processors.

13. The data disc system of claim 10 wherein said disc interface processors each include means for operating the disc drives associated with that disc interface processor asynchronously from disc drives associated with the other disc interface processors.

14. The data disc system of claim 9 wherein said disc interface processors each include means for operating the disc drives associated with that disc interface processor asynchronously from disc drives associated with the other disc interface processors.

* * * * *